(12) United States Patent
DesOrmeaux

(10) Patent No.: US 11,065,655 B2
(45) Date of Patent: Jul. 20, 2021

(54) APPARATUSES, SYSTEMS, AND METHODS FOR CLEANING

(71) Applicant: ECOSERV TECHNOLOGIES, LLC, Abbeville, LA (US)

(72) Inventor: Kenny DesOrmeaux, Abbeville, LA (US)

(73) Assignee: ECOSERV TECHNOLOGIES, LLC, Abbeville, LA (US)

( * ) Notice: Subject to any disclaimer, the term of this patent is extended or adjusted under 35 U.S.C. 154(b) by 494 days.

(21) Appl. No.: 15/786,320

(22) Filed: Oct. 17, 2017

(65) Prior Publication Data

US 2018/0104728 A1 Apr. 19, 2018

Related U.S. Application Data

(60) Provisional application No. 62/409,206, filed on Oct. 17, 2016.

(51) Int. Cl.
*B08B 9/093* (2006.01)
*B05B 13/04* (2006.01)
(Continued)

(52) U.S. Cl.
CPC ........ *B08B 9/0936* (2013.01); *B05B 13/0431* (2013.01); *B05B 12/02* (2013.01);
(Continued)

(58) Field of Classification Search
CPC .......... B25J 9/026; B25J 18/025; B25J 9/042; B08B 9/093; B08B 9/0933; B08B 9/0936; B08B 9/08; B05B 13/0431
See application file for complete search history.

(56) References Cited

U.S. PATENT DOCUMENTS 2,896,643 A   7/1959 Ottoson
3,599,871 A * 8/1971 Ruppel ................. B08B 9/0936
                                                            239/227
(Continued)

FOREIGN PATENT DOCUMENTS

CN         102825040        12/2012
CN         102764750        2/2014
(Continued)

OTHER PUBLICATIONS

U.S. Appl. No. 14/749,347, "Final Office Action", dated Jan. 24, 2018, 29 pages.
(Continued)

*Primary Examiner* — Joseph L. Perrin
*Assistant Examiner* — Kevin G Lee
(74) *Attorney, Agent, or Firm* — Kilpatrick Townsend & Stockton LLP

(57) ABSTRACT

A cleaning apparatus includes a nozzle assembly and an arm supporting the nozzle assembly. In some embodiments, the arm includes a first rotatable arm member defining a first axis and a second rotatable arm member defining a second axis and connected to the first rotatable member. In certain examples, the first rotatable arm is rotatable about the first axis and the second rotatable arm is rotatable about the second axis. The cleaning apparatus also includes at least one sensor on the arm and configured to detect a position of the nozzle assembly based on rotation of the first rotatable arm or the second rotatable arm

11 Claims, 24 Drawing Sheets

(51) Int. Cl.
  *B08B 9/46* (2006.01)
  *B25J 15/00* (2006.01)
  *B05B 12/02* (2006.01)
(52) U.S. Cl.
  CPC .............. *B05B 13/04* (2013.01); *B08B 9/46* (2013.01); *B25J 15/0019* (2013.01)

(56) References Cited

U.S. PATENT DOCUMENTS

| | | | |
|---|---|---|---|
| 3,606,162 A | | 9/1971 | Lehmann |
| 3,664,355 A | | 5/1972 | Adams |
| 3,677,422 A | | 7/1972 | Meyers et al. |
| 3,881,618 A | | 5/1975 | Tausheck |
| 3,900,968 A | | 8/1975 | Shigyo |
| 4,178,632 A | * | 12/1979 | Anthony ................ B25J 9/161 318/568.14 |
| 4,239,431 A | * | 12/1980 | Davini ................ B05B 13/0431 118/323 |
| 4,244,749 A | | 1/1981 | Sachs et al. |
| 4,817,653 A | | 4/1989 | Krajicek et al. |
| 4,828,625 A | | 5/1989 | Moran |
| 4,941,493 A | | 7/1990 | Wieringa |
| 5,037,486 A | | 8/1991 | Sloan |
| 5,093,949 A | | 3/1992 | Sloan |
| 5,335,395 A | | 8/1994 | Allen |
| 5,518,553 A | | 5/1996 | Moulder |
| 5,561,883 A | | 10/1996 | Landry et al. |
| 5,579,787 A | | 12/1996 | Wood |
| 5,640,982 A | | 6/1997 | Landry et al. |
| 5,740,821 A | | 4/1998 | Arnold |
| 5,876,512 A | | 3/1999 | Desormeaux et al. |
| 5,967,160 A | | 10/1999 | Rochette et al. |
| 6,021,793 A | | 2/2000 | Moulder |
| 6,039,056 A | | 3/2000 | Verbeek |
| 6,141,810 A | | 11/2000 | Allen et al. |
| 6,179,929 B1 | | 1/2001 | Gudini et al. |
| 6,321,754 B1 | | 11/2001 | Manabe et al. |
| 7,261,109 B2 | | 8/2007 | Luke et al. |
| 7,635,854 B1 | | 12/2009 | Babin |
| 8,133,328 B2 | | 3/2012 | Delaney et al. |
| 8,260,483 B2 | | 9/2012 | Barfoot et al. |
| 8,942,940 B2 | | 1/2015 | York |
| 8,965,571 B2 | | 2/2015 | Podkaminer et al. |
| 8,997,362 B2 | | 4/2015 | Briggs et al. |
| 9,061,736 B2 | | 6/2015 | Smith |
| 9,739,792 B2 | | 8/2017 | Atwood et al. |
| 9,883,783 B2 | | 2/2018 | Landry et al. |
| 2002/0069897 A1 | | 6/2002 | Emrey |
| 2005/0098196 A1 | | 5/2005 | Hebert |
| 2006/0054189 A1 | * | 3/2006 | Luke ................ B08B 3/024 134/22.1 |
| 2008/0047587 A1 | | 2/2008 | Ball et al. |
| 2008/0142042 A1 | | 6/2008 | Bramsen |
| 2009/0056751 A1 | | 3/2009 | Roscoe |
| 2009/0165826 A1 | * | 7/2009 | Proulx ................ B08B 9/093 134/22.1 |
| 2009/0188535 A1 | | 7/2009 | Taylor et al. |
| 2009/0211605 A1 | | 8/2009 | Ahmad |
| 2011/0126857 A1 | | 6/2011 | Kaipainen |
| 2011/0126862 A1 | | 6/2011 | Rancich |
| 2011/0315164 A1 | | 12/2011 | DesOrmeaux |
| 2011/0315166 A1 | | 12/2011 | Shecterle et al. |
| 2012/0067372 A1 | | 3/2012 | O'Quinn et al. |
| 2013/0074885 A1 | | 3/2013 | Rancich |
| 2013/0269150 A1 | | 10/2013 | Hartley |
| 2015/0122293 A1 | | 5/2015 | DesOrmeaux |
| 2015/0218024 A1 | | 8/2015 | Haase et al. |
| 2015/0375278 A1 | | 12/2015 | Desormeaux |
| 2016/0008859 A1 | | 1/2016 | Høxbroe |
| 2017/0203342 A1 | | 7/2017 | Hunter |
| 2017/0326737 A1 | * | 11/2017 | Martin ................ B25J 9/045 |
| 2018/0000305 A1 | | 1/2018 | Schultink et al. |
| 2018/0070787 A1 | | 3/2018 | Gordon et al. |

FOREIGN PATENT DOCUMENTS

| | | | |
|---|---|---|---|
| CN | 105278431 | | 1/2016 |
| CN | 106077001 | | 11/2016 |
| DE | 10 2012 011 488 A1 | | 12/2013 |
| EP | 0 400 025 B1 | | 9/1993 |
| EP | 2281640 A1 | * | 2/2011 ........... B08B 9/0936 |
| GB | 2478330 | | 9/2011 |

OTHER PUBLICATIONS

U.S. Appl. No. 14/749,347, "Non-Final Office Action", dated Jun. 15, 2017, 30 pages.
U.S. Appl. No. 16/306,293, "Non-Final Office Action", dated Oct. 3, 2019, 14 pages.
International Application No. PCT/US2018/034592, "International Search Report and Written Opinion", dated Aug. 21, 2018, 9 pages.
U.S. Appl. No. 14/875,425, "Advisory Action", dated Mar. 20, 2019, 4 pages.
U.S. Appl. No. 14/875,425, "Non-Final Office Action", dated Jun. 27, 2019, 18 pages.
U.S. Appl. No. 14/875,425, "Final Office Action", dated Dec. 27, 2018, 17 pages.

* cited by examiner

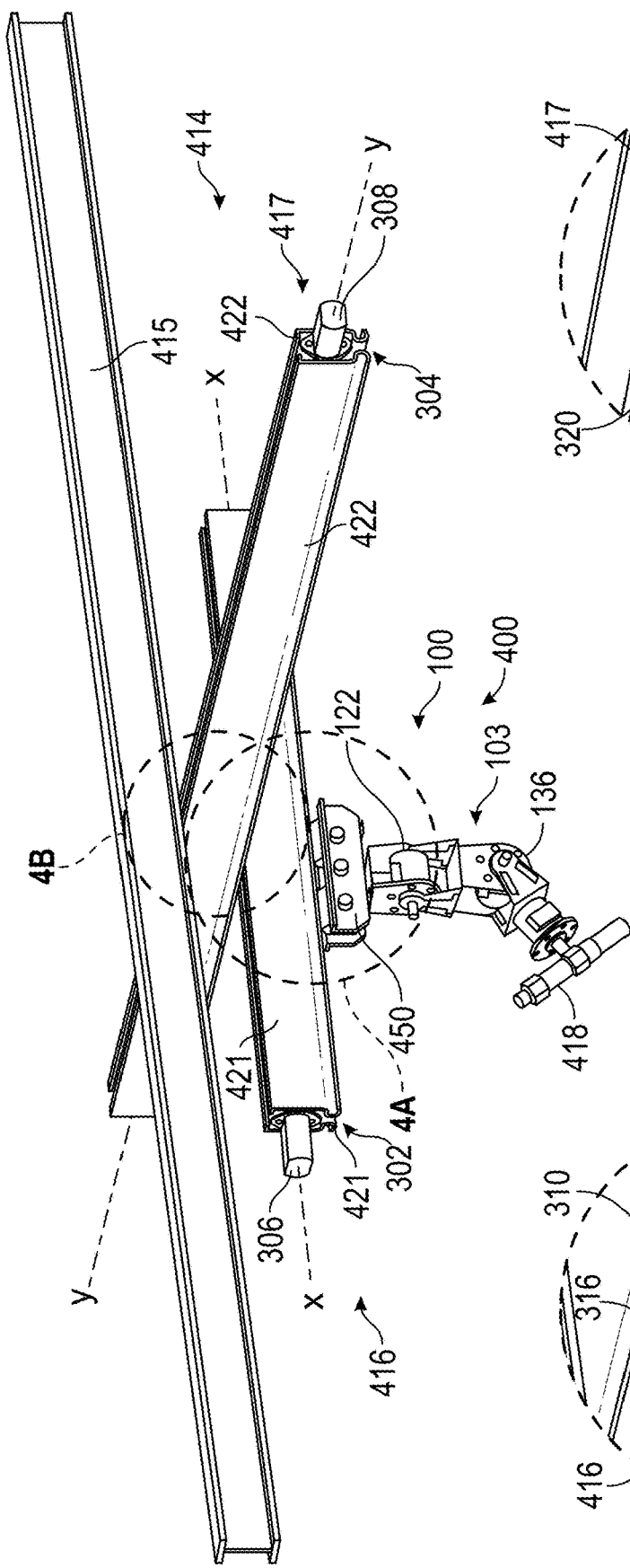
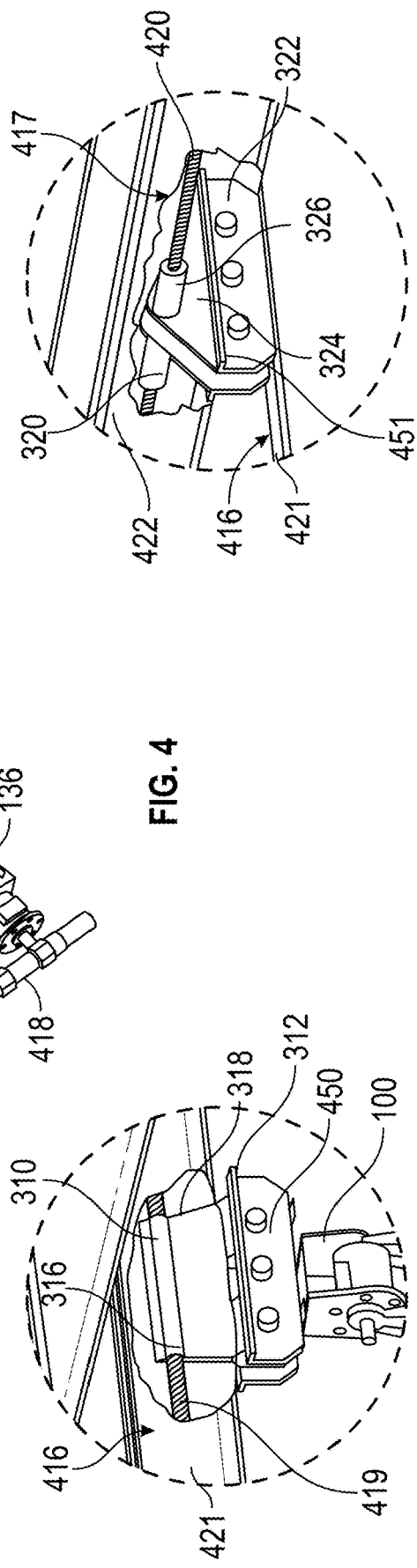
FIG. 4
FIG. 4A
FIG. 4B

APPARATUSES, SYSTEMS, AND METHODS FOR CLEANING

REFERENCE TO RELATED APPLICATION

This application claims the benefit of U.S. Provisional Application No. 62/409,206, filed Oct. 17, 2016 and entitled APPARATUSES, SYSTEMS, AND METHODS FOR CLEANING, the content of which is hereby incorporated by reference in its entirety.

FIELD OF THE INVENTION

The present disclosure relates to apparatuses, systems, and methods for the cleaning of surfaces, and in particular though non-limiting embodiments, to apparatuses, systems, and methods for cleaning containers, tanks, or vessels by fluidizing and removing materials within their interiors using a programmable and articulating arm.

BACKGROUND

Conventional tank cleaning is often a long, stringent, hazardous, and labor-intensive task. Conventional methods of tank and vessel cleaning require operator exposure to dangerous environments. The work of an operator typically involves manually placing a remotely operated vehicle (ROV) into position in an enclosed and/or confined area, locking the ROV into place, controlling the ROV to perform a specified task, and removing the ROV from the enclosed area. ROVs have traditionally been used for a variety of reasons, including reduced costs, increased time-effectiveness, increased strength capabilities over human workers, and improved safety by reducing man hours spent in confined spaces.

Existing remote tank cleaning systems include a nozzle configured to direct a fluid stream to dislodge, dilute, or dissolve settled solids from tank interiors. These systems generally require extensive mounting or setup within these tanks or containers prior to cleaning, during which workers may be subject to prolonged exposures to the contents being cleaned. Mounted systems may only be able to mount in a limited number of locations within the tanks or containers, limiting the utility of the system. Some systems include extensive robotic components that are bulky, heavy, and difficult to assemble and/or disassemble. Often, the systems cannot be utilized in remote or difficult to reach interiors of tanks, containers, and/or vessels because of the difficulty involved in bringing the system to the site. The systems usually require one or more booms or cranes to place the system near or into a target enclosed area. Additionally, cleaning systems typically involve attachment to or placement upon a floor of a target enclosed area, meaning that the system is placed upon and/or covering a portion of the very sludge/materials the system is intended to clean. Floor mounted systems must also account for other issues in the floor, such as baffles, irregular surfaces, and debris.

On the other hand, cleaning systems that are less bulky or require less assembly are typically insufficiently stable to withstand high water pressures necessary to fluidize settled solids and/or sludge to where they can be easily pumped out. In such cases, the solids and/or sludge must be physically and/or mechanically removed by workers from the interior of enclosed areas, placing the workers in a dangerous and/or toxic environment and therefore at greater risk of exposure to health hazards and injuries.

Additionally, existing tank cleaning systems use fluid directing systems that result in random, wasted movement. For example, some cleaning systems utilize gamma jets that perform cleaning via a 360° spherical spray pattern/movement. However, in these systems, it is not possible to control the cycle of a gamma jet once activated, thereby making it difficult to focus on specific areas in need of cleaning.

Accordingly, a need exists for an improved apparatus, system, and method to remotely remove materials, including settled solids, fluids, slurries, and/or sludge, from a vessel, container, and/or tank interior in a manner that is more efficient and safer than existing systems.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

Embodiments of the present disclosure provide for improved methods, systems, and apparatuses for cleaning by implementation of a programmable, multi-axis articulating arm (MAAA) having a plurality of connected arm segments. Embodiments of the present disclosure provide for purpose driven, focused movement, rather than random, wasted movement. The MAAA may be connected to a track system. Each arm segment may have sensor and positioning components configured to provide a signal to a Programmable Logic Control (PLC) device to ensure correct positioning of the MAAA and track system according to pre-programmed algorithms. The algorithms may provide an efficient manner of cleaning an enclosed area without requiring constant repetitious movements from an operator.

Embodiments of the present disclosure are configured to work integrally with an operator and amplify the impact of an operator by taking over the most repetitious of tasks. The interoperability of the system with the operator provides a safer and higher quality end product. The operator may be incorporated in the process by overseeing and ensuring the quality of work by the automated process. The programmable MAAA is designed to apply state of the art cleaning techniques with better-than-human accuracy. For example, a typical crew of seven workers may be replaced by a crew of two, resulting in cost reductions and making programmed cleaning an economically viable alternative on a greater number of enclosed areas, potentially leading to an increase in skilled employment in the trade.

The present disclosure also addresses major safety concerns by reducing and/or eliminating man-hours spent in confined spaces. Embodiments of the present disclosure provide for a safe, efficient, and cost-saving alternative to placing workers in confined spaces and allow for completion of a safe and successful cleaning job while reducing project turnaround time.

In an example embodiment of the present disclosure, a cleaning apparatus is provided. The cleaning apparatus includes a base having at least one magnet; an arm having a first end attached to the base and extending away from the base; and a nozzle attached to a second end of the arm. The arm may include at least two rotatable joints allowing for manipulation of the nozzle. The base may be configured to magnetically attach to a metal surface. The at least one magnet may be an electromagnet. The apparatus may further include at least one additional magnet configured to attach to the metal surface. The base may include base extensions extending from the at least one magnet at a first end and attaching to a plate at a second end. The apparatus may further include a support beam having a first end attached to the metal surface and a second end attached to the plate. The arm may include a first arm member attached to the plate; and a second arm member attached to the first arm member. The first arm member may be configured to rotate relative to the plate around a first axis. The second arm member may be configured to rotate relative to the first arm member around a second axis that is substantially perpendicular to the first axis. The apparatus may include a pressure line mount configured to facilitate flow of high pressure fluids for cleaning. The pressure line mount may be connected to the second arm member via attachment to the nozzle at a first end and a pressure line at a second end. The nozzle may include dual spay ends. The nozzle may rotate such that each dual spray end spins and provides dual rotating jets of water for breaking-up materials.

The apparatus may include control lines connected to a control station, the control lines configured to control movement of the at least two rotatable joints. The control lines may be at least one of electrical, pneumatic, and hydraulic. The apparatus may be configured to be disassembled into at least two separate components. The at least two separate components may include handles. The arm may include additional arm members such that the arm has more than two axes of articulated movement. The first arm member may include first and second hinge connectors and the second arm member may include third and fourth hinge connectors. The first hinge connector may be fixedly attached to the plate and the second hinge connector may be rotatably attached to the first hinge connector such that the second hinge connector rotates relative to the plate around the first axis. The third hinge connector may be fixedly attached to the second hinge connector and the fourth hinge connector may be rotatably attached to the third hinge connector such that the fourth hinge connector rotates relative to first arm member around the second axis.

In an example embodiment of the present disclosure, a system for cleaning an area is provided. The system includes a cleaning apparatus; at least one camera mounted within the area; and a vacuum line. The cleaning apparatus includes a base having at least one magnet; an arm having a first end attached to the base and extending away from the base; and a nozzle attached to a second end of the arm. The arm may include at least two rotatable joints allowing for manipulation of the nozzle. The apparatus may be configured to spray a fluid via the nozzle and the vacuum line removes the fluid and any materials contained in the fluid. An operator may view the apparatus and area via the at least one camera. The system may include control lines configured to control movement of the at least two rotatable joints. The control lines may be connected to a control station and configured to allow the operator to remotely operate the apparatus. The system may include first and second longitudinal bars movably attached to each other. The apparatus may be movably attached to the first bar. The second bar may be movably attached to a mounting structure. The first and second bars and the apparatus may be movable in multiple directions and axes. The first and second bars may be perpendicularly attached to each other. The apparatus may be magnetically attached to the first bar via the at least one magnet. The second bar may be perpendicularly attached to the mounting structure.

In an example embodiment of the present disclosure, a cleaning and track system is provided. The system includes a cleaning apparatus, a track system, at least one camera mounted within the area; and a vacuum line. The apparatus includes a base; an arm having a first end attached to the base and extending away from the base; and a nozzle attached to a second end of the arm. The arm may include at least two rotatable joints allowing for manipulation of the nozzle. The track system may include first and second longitudinal bars movably attached to each other. The second bar may be movably attached to a mounting structure. The first and second bars may be movable in multiple directions and axes. The apparatus may be movably attached to the track system. The apparatus may be configured to spray a fluid via the nozzle and the vacuum line removes the fluid and any materials contained in the fluid. An operator may view the apparatus and area via the at least one camera. The system may include control lines configured to control movement of the at least two rotatable joints. The control lines may be connected to a control station and configured to allow the operator to remotely operate the apparatus and track system.

In an example embodiment of the present disclosure, a method of cleaning an area is provided. The method includes magnetically mounting a cleaning apparatus within the area; connecting the cleaning apparatus to a high pressure fluid line; remotely operating the cleaning apparatus to control a direction of flow from the high pressure fluid line; directing a flow of fluids towards material on a surface of the area to remove the material from the surface; and removing the fluids and material via a vacuum line. The cleaning apparatus includes a base having at least one magnet; an arm having a first end attached to the base and extending away from the base; and a nozzle attached to a second end of the arm. The arm may include at least two rotatable joints allowing for manipulation of the nozzle. The apparatus may be remotely operated via control lines connected from a control station to the apparatus, the control lines configured to control movement of the at least two rotatable joints. The method may include magnetically attaching the at least one magnet to a track system. The track system may include first and second longitudinal bars movably attached to each other. The apparatus may be movably attached to the first bar. The second bar may be movably attached to a mounting structure. The first and second bars and the apparatus may be movable in multiple directions and axes.

The apparatus may be programmed by the steps of instructing a route to the apparatus by the steps of controlling the apparatus and defining the route via implementation of a starting cleaning sequence, and logging resulting route data from sensor and positioning components to a memory. The sensor and positioning components may be located on at least one of the apparatus and track system. The route may include an initial cleaning of the area including a sequence of maneuvers positioning the apparatus for optimal cleaning purposes. The apparatus may further be programmed by the steps of processing logged route data into a route profile, and reproducing the route profile automatically using a Programmable Logic Control (PLC) device. The route profile may include a defined optimal cleaning sequence. The apparatus may be operated by the steps of implementing the stating cleaning sequence using the PLC device; sending the signal to an Electro-Hydraulic Flow Control (EHFC) device via the PLC device; positioning the apparatus and arm in an optimal cleaning position based on the signal and flow via the EHFC device; and performing a cleaning motion for a predetermined amount of time according to the defined optimal cleaning sequence. The PLC device may be configured to receive an electrical signal from the sensor and positioning components once the starting cleaning sequence is implemented. The EHFC device may be configured to provide at least one of hydraulic, pneumatic, and electrical flow. The PLC device may be configured to repeat the defined optimal cleaning sequence by simultaneously sending and receiving signals. The method may include observing movements of the cleaning apparatus and track system via at least one camera mounted within the area or on the apparatus. The steps for operating the apparatus may be repeated until the area is cleaned. The method may include turning off the at least one magnet to dismount the cleaning apparatus. The at least one magnet may be electro-magnetic.

In an example embodiment of the present disclosure, a cleaning apparatus is provided. The apparatus includes a base; an arm having a first end attached to the base and extending away from the base; and a nozzle attached to a second end of the arm. The arm may include at least two rotatable joints allowing for manipulation of the nozzle. The apparatus may include base extensions extending from the base at a first end and attaching to a plate at a second end. The arm may include a first arm member attached to the plate; and a second arm member attached to the first arm member. The first arm member may be configured to rotate relative to the plate around a first axis. The second arm member may be configured to rotate relative to the first arm member around a second axis that is substantially perpendicular to the first axis. The apparatus may include a pressure line mount configured to facilitate flow of high pressure fluids for cleaning. The pressure line mount may be connected to the second arm member via attachment to the nozzle at a first end and a pressure line at a second end. The apparatus may include control lines connected to a control station, the control lines configured to control movement of the at least two rotatable joints.

In an example embodiment of the present disclosure, a cleaning apparatus is provided. The apparatus includes an arm and a nozzle assembly attached to an end of the arm. The arm includes at least two rotatable arm members allowing for manipulation of the nozzle assembly and at least one sensor attached to each of the at least two rotatable arm members to detect the positioning and location of the apparatus.

In an example embodiment of the present disclosure, a cleaning and track system is provided. The system includes a cleaning apparatus and a track system movably attached to the apparatus. The apparatus includes an arm and a nozzle assembly attached to an end of the arm. The arm includes at least two rotatable arm members allowing for manipulation of the nozzle assembly and at least one sensor attached to each of the at least two rotatable arm members to detect the positioning and location of the apparatus. The track system includes a gear rack and a track member movably attached to the gear rack. A first end of the track member is attached to the apparatus and the second end of the track member is attached to a bi-directional drive motor. The motor is attached to the track member such that a gear of the motor interfaces with the rack to facilitate movement of the track system and apparatus along the rack. At least one camera is mounted near the cleaning and track system. A vacuum line is mounted near the cleaning and track system. The apparatus is configured to spray a fluid via the nozzle assembly and the vacuum line removes the fluid and any materials contained in the fluid. An operator views the apparatus via the at least one camera.

According to certain embodiments, a cleaning apparatus includes a nozzle assembly and an arm supporting the nozzle assembly. In some embodiments, the arm includes a first rotatable arm member defining a first axis, and the first rotatable arm is rotatable about the first axis. In various embodiments, the arm includes a second rotatable arm member defining a second axis and connected to the first rotatable member, and the second rotatable arm is rotatable about the second axis. In certain aspects, the cleaning apparatus includes at least one sensor on the arm and configured to detect a position of the nozzle assembly based on rotation of the first rotatable arm or the second rotatable arm.

According to various embodiments, a cleaning system includes a cleaning apparatus and a drive system. In certain aspects, the drive system includes a track and a carriage movable along the track. In some embodiments, the carriage includes a spring block, a track member, and at least one spring connecting the spring block and the track member. The at least one spring member is movable between an expanded position and a compressed position such that the r spring block is adjustable relative to the track member. In certain examples, the cleaning apparatus is attached to the carriage.

According to certain embodiments, a cleaning system includes a cleaning apparatus with a nozzle assembly and an arm supporting the nozzle assembly. In some embodiments, the arm includes a first rotatable arm member defining a first axis and a second rotatable arm member defining a second axis and connected to the first rotatable member. The first rotatable arm is rotatable about the first axis and the second rotatable arm is rotatable about the second axis. In various embodiments, at least one sensor is on the arm and configured to detect a position of the nozzle assembly based on rotation of the first rotatable arm or the second rotatable arm. In certain embodiments, the cleaning system also includes a drive system having a track and a carriage movable along the track, where the cleaning apparatus is attached to the carriage.

Various implementations described in the present disclosure can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures can be designated by matching reference characters for the sake of consistency and clarity.

FIG. 4 is an isometric view of a cleaning and track system according to aspects of the present disclosure.

FIG. 4A is an enlarged partial cutaway view of an attachment within the cleaning and track system of FIG. 4.

FIG. 4B is an enlarged partial cutaway view of another attachment within the cleaning and track system of FIG. 4.

DETAILED DESCRIPTION

Figure 1:
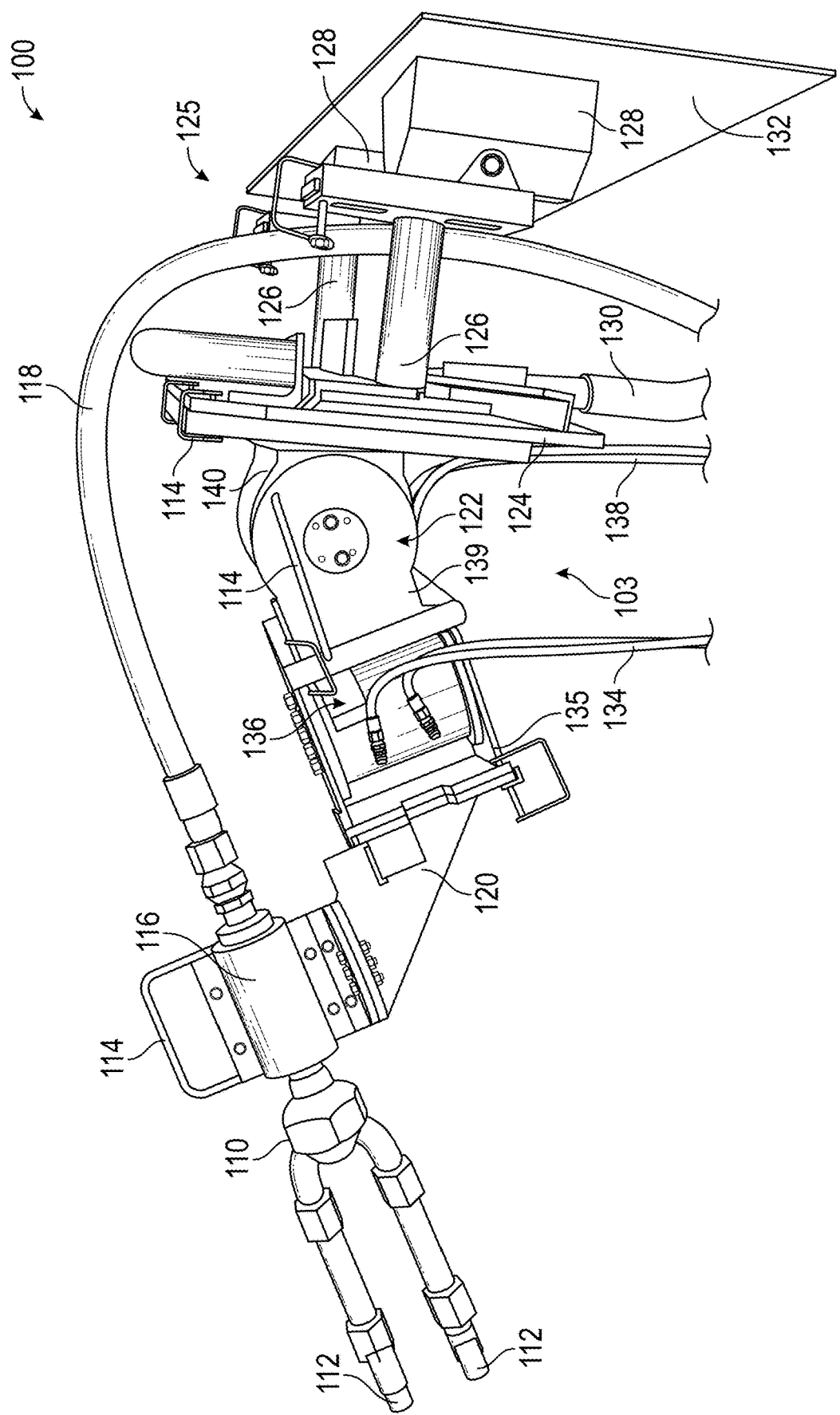
FIG. 1 is an isometric view of a cleaning apparatus according to aspects of the present disclosure.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "up," "down," "top," "left," "right," "front," and "back," among others are intended to refer to the orientation as illustrated and described in the figure (or figures) to which the components and directions are referencing.

Embodiments of the present disclosure include a cleaning apparatus having a programmable MAAA. Embodiments of the MAAA may be portable, meaning that the MAAA may be capable of easily being disassembled into separate components and transported. The apparatus may be mounted on a wall in an interior of an enclosed area to be cleaned. The enclosed area may be defined by interiors and/or exteriors of containers, vessels, tanks, or other structures that require cleaning. The apparatus may also be mounted on a manhole or similar opening in other embodiments. The apparatus may include at least one magnet configured to magnetically mount the apparatus, although it need not. Magnetic mounting allows for the apparatus to be mounted at virtually unlimited locations with the enclosed area, allowing for more focused and efficient cleaning and simple removal. The apparatus may also be bolted in place. The apparatus may include a high pressure fluid line and high pressure nozzles. The apparatus may be configured for remote operation by an operator outside of the enclosed area being cleaned.

Embodiments of the present disclosure also include a cleaning and track system. In some embodiments, the cleaning and track system includes a cleaning apparatus as described herein mounted to a track system and/or mounting structure placed within an enclosed area, and the MAAA of the apparatus may be movable through additional axes within the enclosed area. The cleaning and track system may be controlled manually or from pre-programmed algorithms through a PLC device. Sensor and positioning components on the MAAA and/or track system may provide a signal to the PLC device to ensure correct positioning of the MAAA and/or track system according to the pre-programmed algorithms.

The cleaning apparatus and/or cleaning and track system may be configured such that they are attachable at a location near an area targeted for cleaning within the enclosed area. Embodiments of the present disclosure are durable and allow for precise control of water flows, which may be directed at specific problem or target areas rather than merely cycling to clean the entire enclosed area. Performing targeted cleaning allows for increased efficiency and decreased waste.

Figure 2:
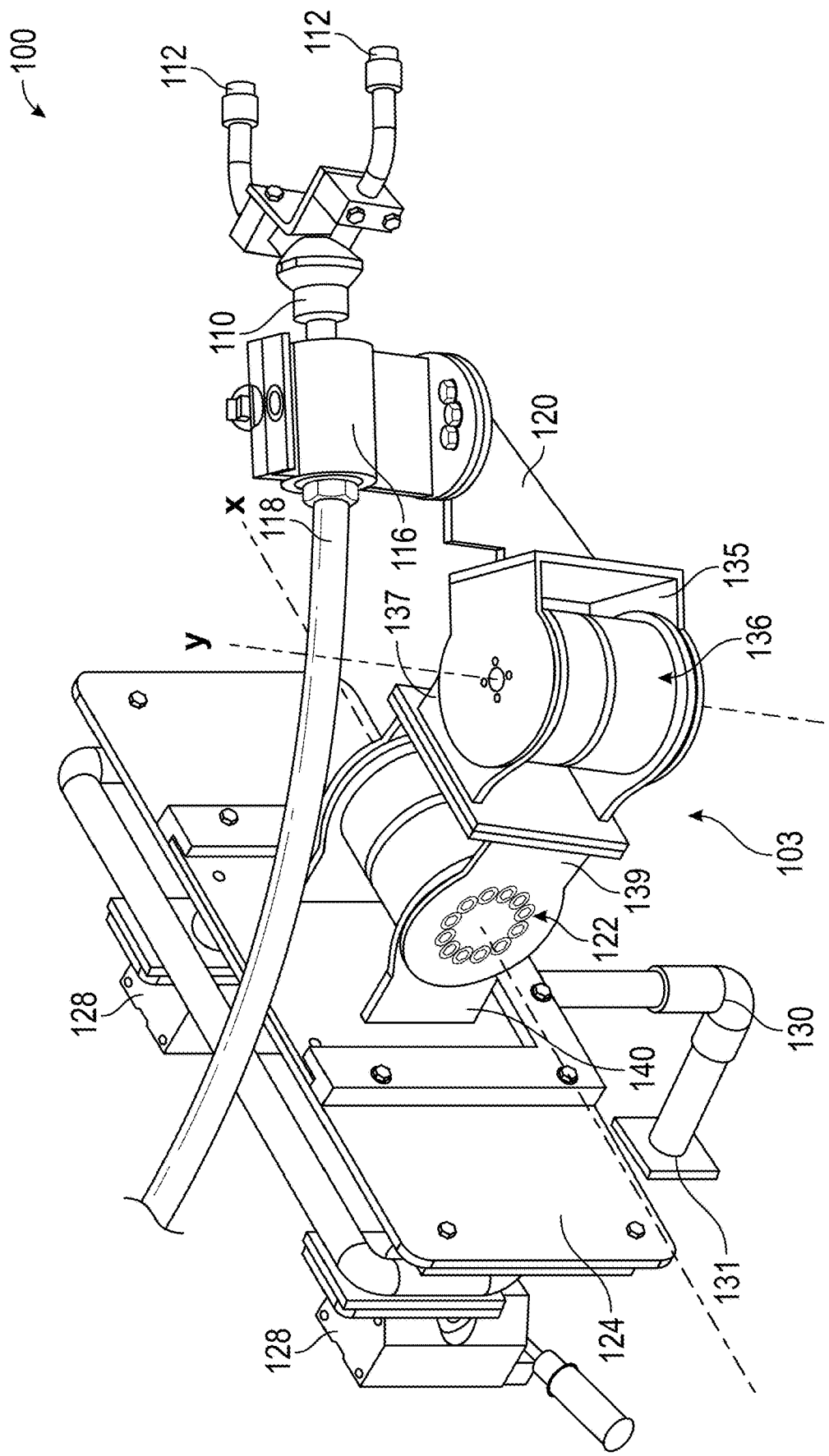
FIG. 2 is an isometric view of the cleaning apparatus of FIG. 1.
Figure 3:
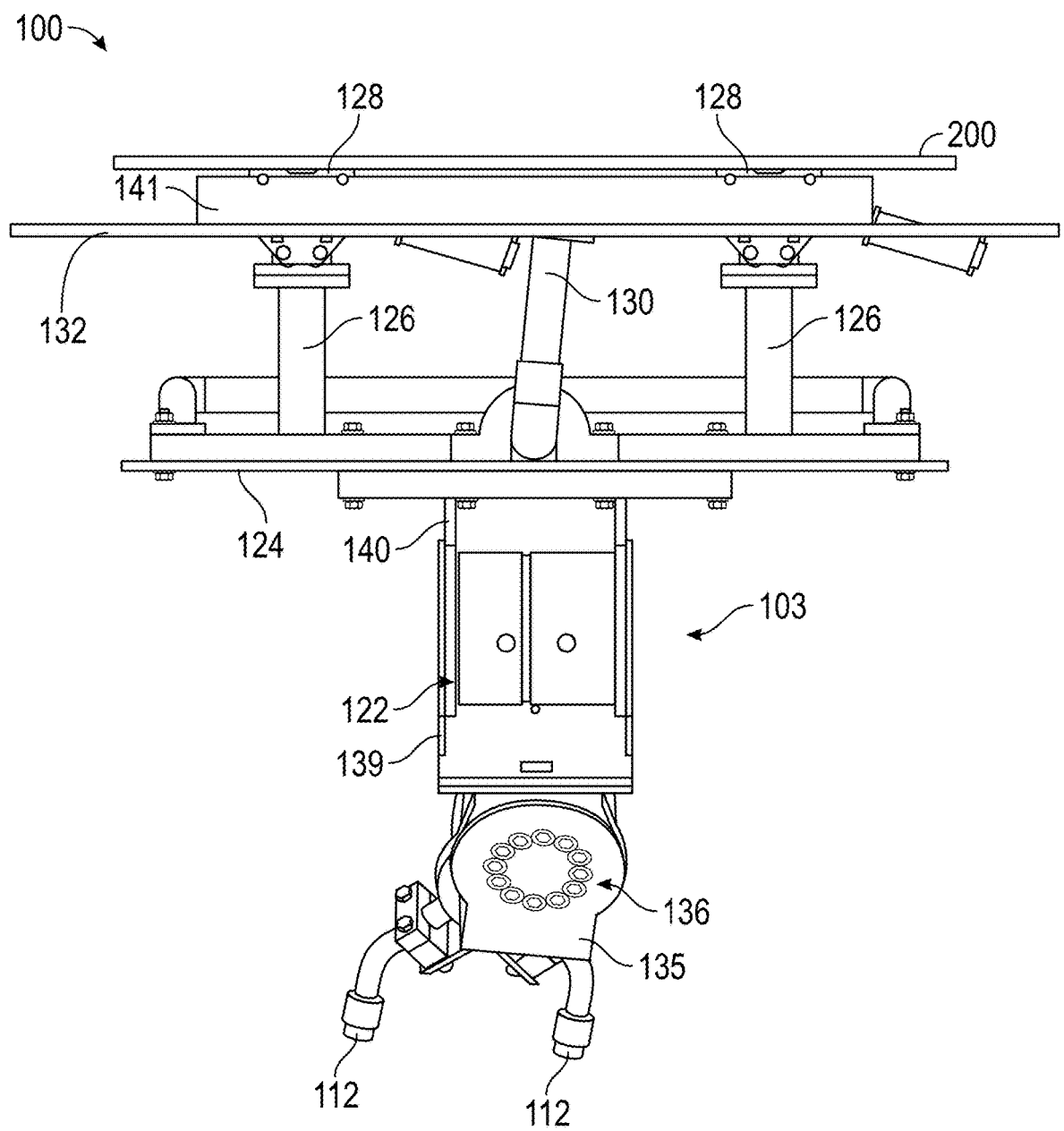
FIG. 3 is a top view of the cleaning apparatus of FIG. 1.

Referring now to FIGS. 1-3, different views of a cleaning apparatus 100 are illustrated. The apparatus 100 includes an MAAA 103. The MAAA 103 includes a plurality of connected arm segments having a first arm member 122 and second arm member 136. In other embodiments, the MAAA may have more or less arm members. First arm member 122 extends from plate 124. Second arm member 136 is attached to first arm member 122 distal to a plate 124.

First and second arm members 122, 136 may each include at least one rotatable joint configured so that the arm members 122, 136 may be manipulated in multiple directions. In exemplary embodiments, the first arm member 122 includes first and second hinge connectors 140, 139. In some embodiments, the first hinge connector 140 is fixedly attached to plate 124. The second hinge connector 139 is rotatably attached to first hinge connector 140 such that second hinge connector 139 rotates relative to plate 124 and to first hinge connector 140 about a first axis of rotation. As shown in FIG. 2, in some embodiments, the second hinge connector 139 rotates about the X-axis.

The second arm member 136 includes third and fourth hinge connectors 137, 135. The third hinge connector 137 is fixedly attached to second hinge connector 139 such that second arm member 136 rotates about the same axis of rotation as the second hinge connector 139. The fourth hinge connector 135 is rotatably attached to third hinge connector 137 such that fourth hinge connector 135 rotates relative to the third hinge connector 137 and first arm member 122 about a second axis of rotation that is substantially perpendicular to the first axis of rotation of the second hinge connector 139. As shown in FIG. 2, in some embodiments, the fourth hinge connector 135 rotates about the Y-axis.

The combination of the rotation of first arm member 122 and second arm member 136 allows for the MAAA 103 to be moved up and down and side to side, covering the entire surface of the interior of the enclosed area. In some embodiments, the first arm member 122 and the second arm member 136 may include swivel connectors and/or other connections/joints to facilitate cleaning by apparatus 100. In other embodiments, the number and location of the hinge connectors and/or swivel connectors may be varied to achieve movement of apparatus 100 along additional axes as desired.

As illustrated in FIG. 2, in some examples, an elbow member 120 is attached to second arm member 136. In some non-limiting examples, the elbow member 120 is attached to the fourth hinge connector 135, although it need not be. In certain embodiments, the elbow member 120 extends away from second arm member 136 and attaches to a pressure line mount 116.

A nozzle 110 is attached to a first end of the pressure line mount 116. A pressure line 118 is attached to a second end of pressure line mount 116. As shown in FIGS. 1-3, in some embodiments, the nozzle 110 includes dual spray ends 112. In some examples, the nozzle 110 may be a variable speed nozzle that rotates, thereby spinning each dual spray end 112 and providing dual rotating jets of fluids (such as water or other suitable fluids) for breaking-up and fluidizing materials. Alternatively, the nozzle 110 may include a single spray end and/or other suitable configuration designed to provide fluid at high pressures to fluidize material. Water flow through the nozzle 110 may be provided at high pressures and high flow rates. In exemplary embodiments, the water flow is approximately 100 GPM (gallons per minute) at approximately 900 PSI (pounds per square inch). In certain embodiments, the apparatus 100 may be controlled to accommodate different (e.g., increased or reduced) flow rates and pressures. In certain examples, the apparatus may be controlled through various mechanisms including, but not limited to, by increasing magnetic strength, changing the number and/or configuration of magnets, changing the configuration of components of apparatus 100, and/or providing additional supports for mounting apparatus 100 against the interior wall 132 and/or floor of the enclosed area, or various other suitable mechanisms.

In some embodiments, and as illustrated in FIG. 1, the apparatus 100 includes a base 125 with a pair of magnets 128 configured to mount apparatus 100 to wall 132, such as within an enclosed area. Depending on the type of container or item to be cleaned, the wall 132 may be made of metal or has metallic properties such that magnets 128 may easily attach to wall 132. The magnets 128 may be sufficiently strong to withstand the forces of the apparatus 100 during manipulation and cleaning while maintaining its location within the enclosed area. In exemplary embodiments, the magnets 128 are electromagnets supplied with controllable electric current such that the magnetic field is "turned off" for removal of apparatus 100. In other embodiments, and again depending on the type of container or item to be cleaned, the wall 132 may not be made of metal or have metallic properties such that a metallic material may have to be placed on an outside surface of the wall 132 to allow for the magnets 128 to mount the apparatus 100 to the wall 132 via attraction of magnets 128 to metallic material. Although disclosed as attaching to the wall 132 via the magnets 128, the apparatus 100 may utilize other permanent and/or non-permanent mechanisms to attach to the wall 132 including, but not limited to, pins, nuts, bolts, chains, screws, clips, clasps, hooks, and various other suitable mechanisms for mounting the apparatus 100 on the wall 132 either permanently or non-permanently.

The base 125 may include base extensions 126. As illustrated in FIG. 1, in some examples, a first end of each base extension 126 is connected to at least one magnet 128, and a second end of each base extension 126 is connected to a plate 124. As illustrated in FIG. 2, a support beam 130 may be provided to further support the apparatus 100. In some embodiments, the support beam 130 includes a first end attached to the plate 124 and/or the base extensions 126 and a second end 131 attachable to the wall 132 through various permanent or non-permanent mechanisms as discussed above. The support beam 130 may have a curved shape, flat shape, or other shape to support apparatus 100.

In some examples, as illustrated in FIG. 1, the apparatus 100 may include handles 114 to allow a worker to carry components of MAAA 103 to a desired location. The location and/or number of handles 114 should not be considered limiting on the current disclosure, as any number of handles 114 may be provided at various locations on the apparatus 100 as desired. In one non-limiting example, the apparatus 100 may separate into two or more components for transport, and each component may include at least one handle 114, although they need not. For example, in one non-limiting embodiment, one handle 114 may be on the base 125 and another handle may be on the MAAA 103 as illustrated in FIG. 1. In a specific embodiment, the apparatus 100 may separate into five separate components, allowing for easy transport and access to difficult to reach locations. The apparatus 100 may be assembled within an enclosed area, or outside the enclosed area and placed into the area fully assembled.

The first and second arm members 122, 136 may be connected to control lines 134, 138 as illustrated in FIG. 1. The control lines 134, 138 are configured to control movement (e.g., rotation) of the first and second arm members 122, 136 via pneumatics, electronics, hydraulics, or other applicable combinations or other suitable movement mechanisms thereof.

In certain embodiments, the apparatus 100 may be remotely controlled by an operator at a control station external to the enclosed area. The control station may be operatively connected to the apparatus 100 and transmits signals to apparatus 100 via control lines 134, 138 based on the operator's input at the control station. In various embodiments, a camera may be attached to the enclosed area prior to apparatus 100 being mounted to the enclosed area, or may be attached to apparatus 100 prior to mounting. A display device may also be provided at the control station so that the operator may monitor the apparatus 100 inside the enclosed area via the camera and make any necessary adjustments to apparatus 100.

In some non-limiting embodiments, as illustrated in FIG. 3, the apparatus 100 may be attached to an external plate 200 and placed into an enclosed area at a manway access point 141. In this embodiment, the apparatus 100 is attached to the external plate 200 and then lowered into the enclosed area to be cleaned. In various embodiments, the external plate 200 is sized such that the that external plate 200 remains external and only the apparatus 100 reaches into the enclosed area. In one non-limiting example, a width of the external plate 200 may be greater than a width of the manway access point 141. The external plate 200 may include one or more holes for line access such as a vacuum line and/or pressurized fluid line. Optionally, the external plate 200 may include handles for maneuvering.

Figure 10:
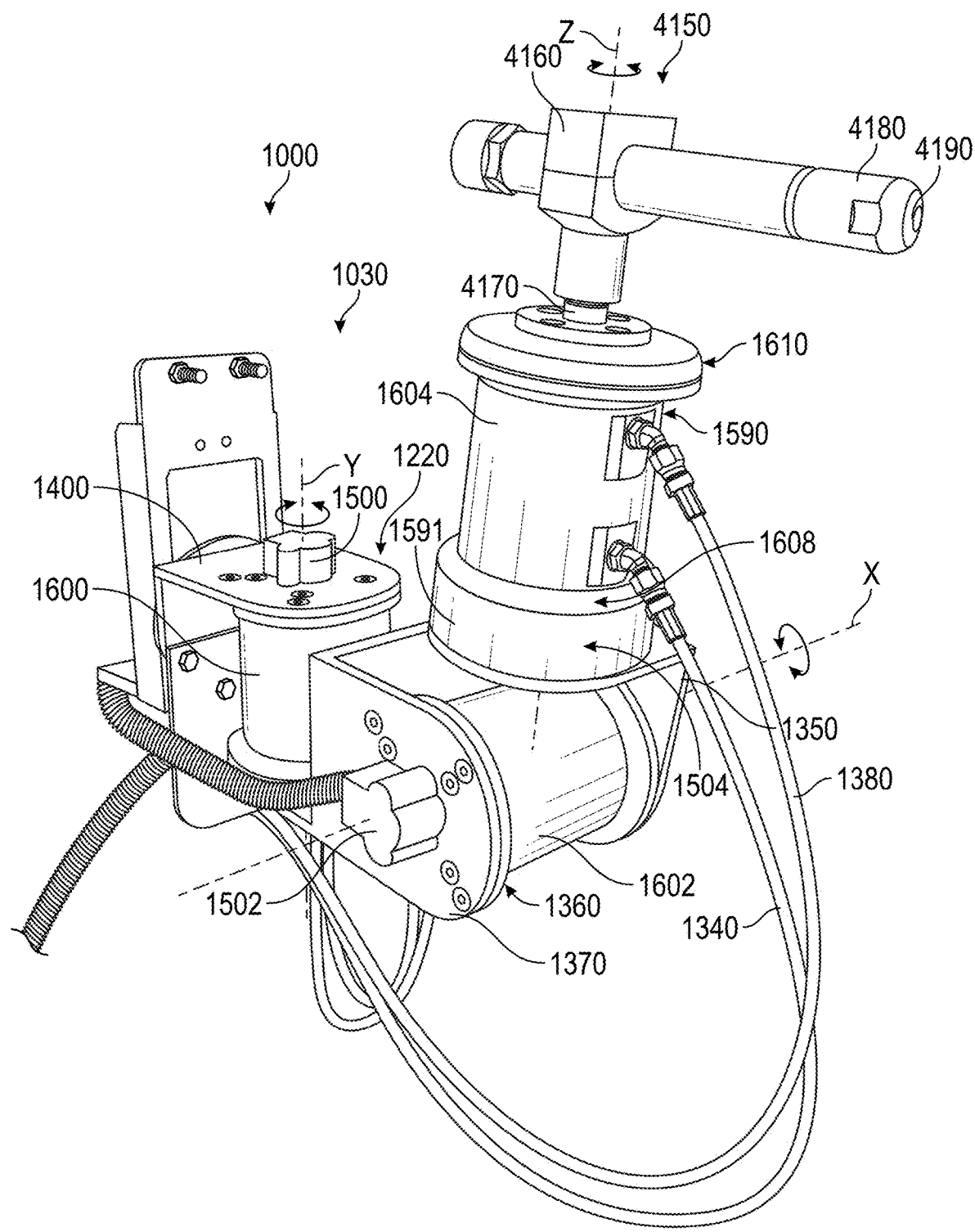
FIG. 10 is another isometric view of the cleaning apparatus of FIG. 7.
Figure 11:
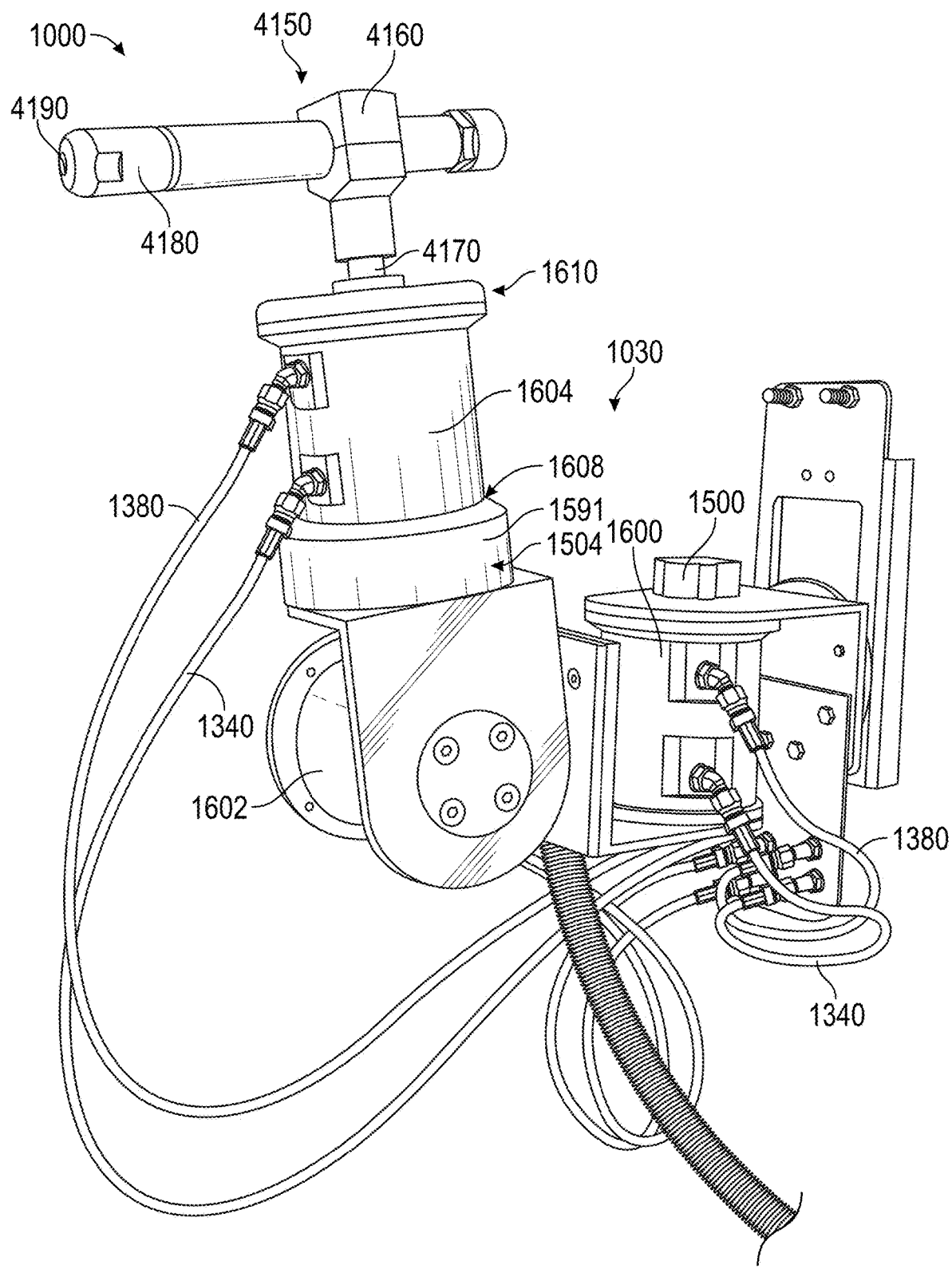
FIG. 11 is another isometric view of the cleaning apparatus of FIG. 7.
Figure 12:
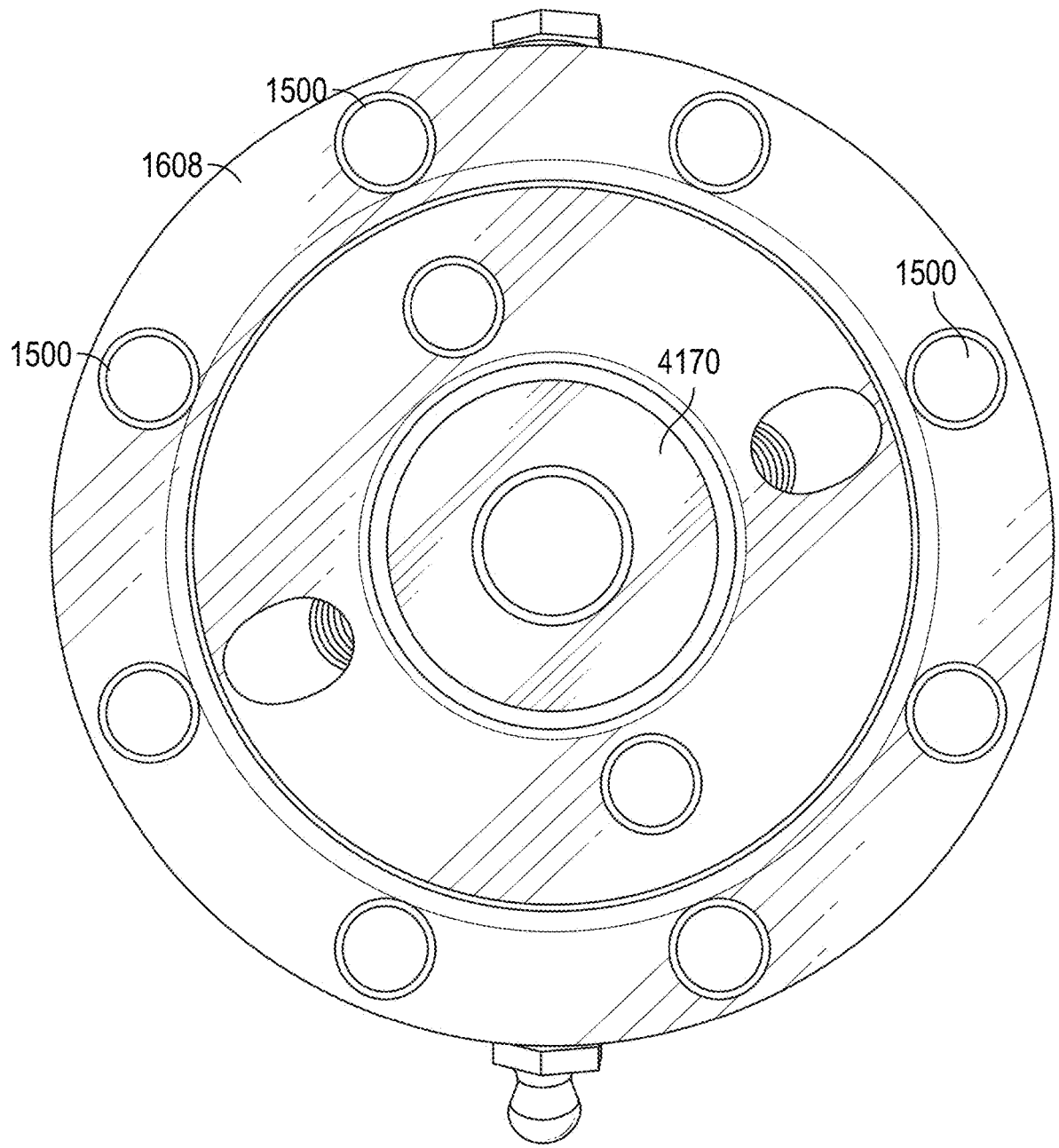
FIG. 12 is a front view of a fixed end of an actuator assembly according to aspects of the present disclosure.
Figure 13:
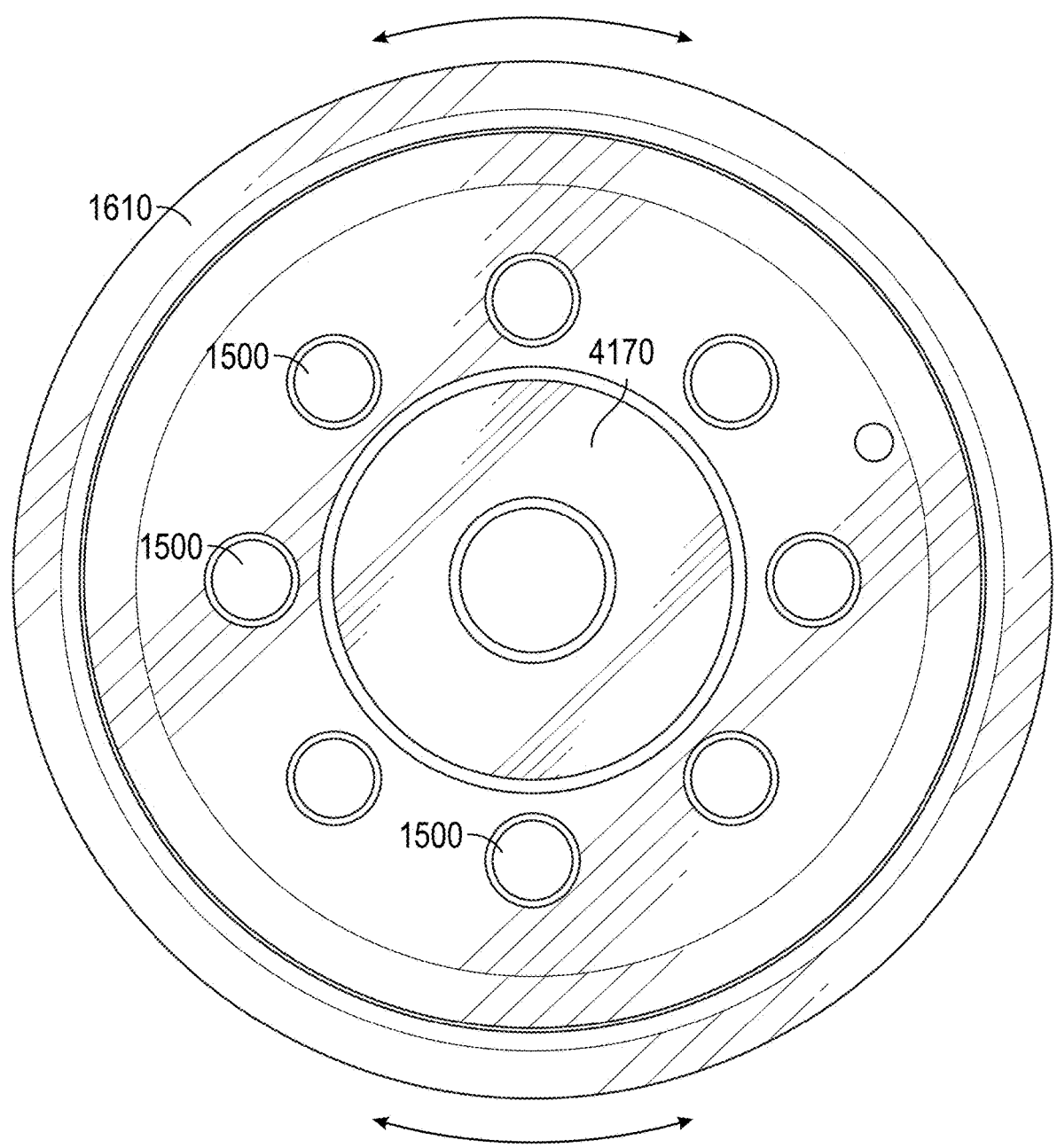
FIG. 13 is a front view of a rotating end of an actuator assembly according to aspects of the present disclosure.
Figure 14:
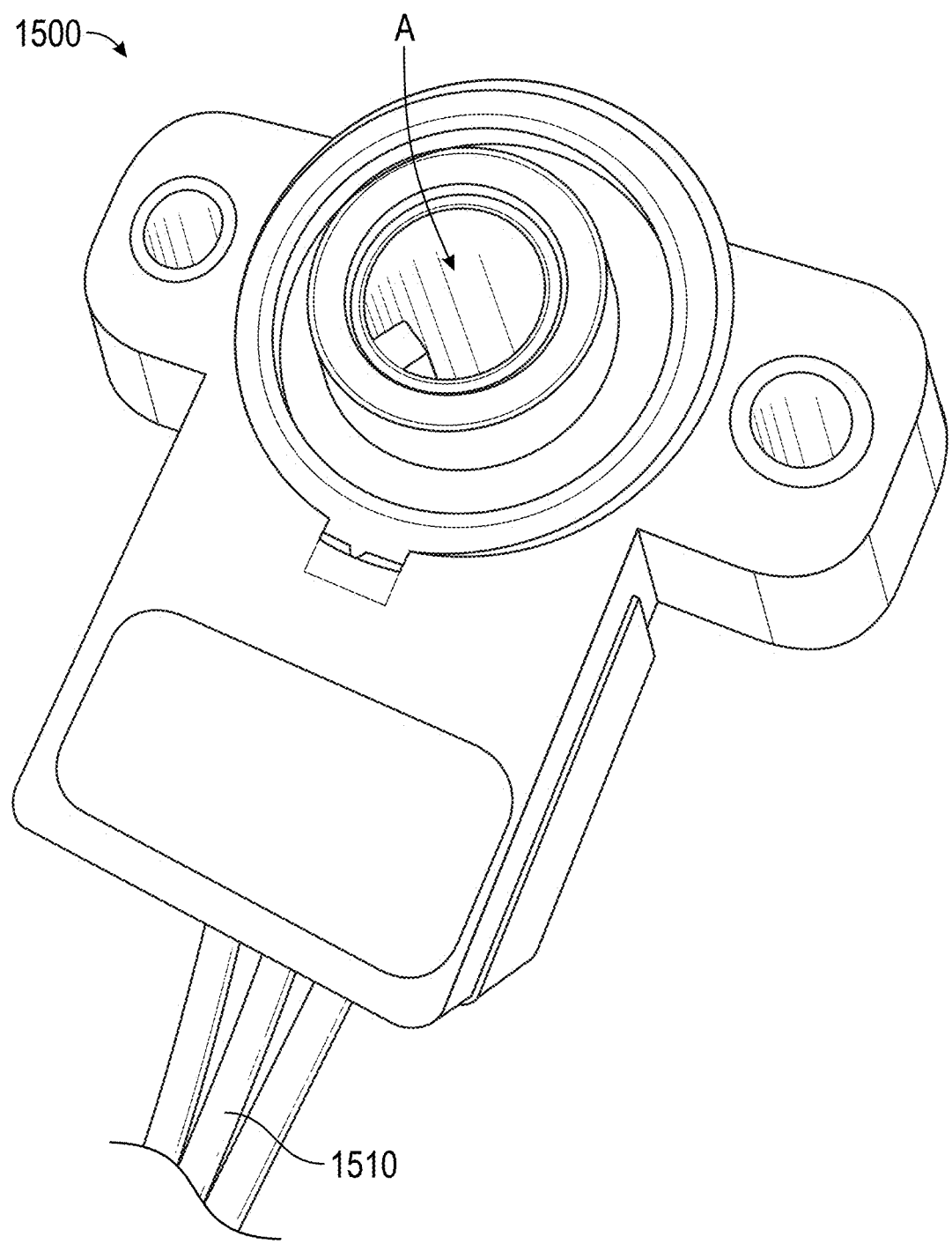
FIG. 14 is an isometric view of a position sensor.
Figure 15:
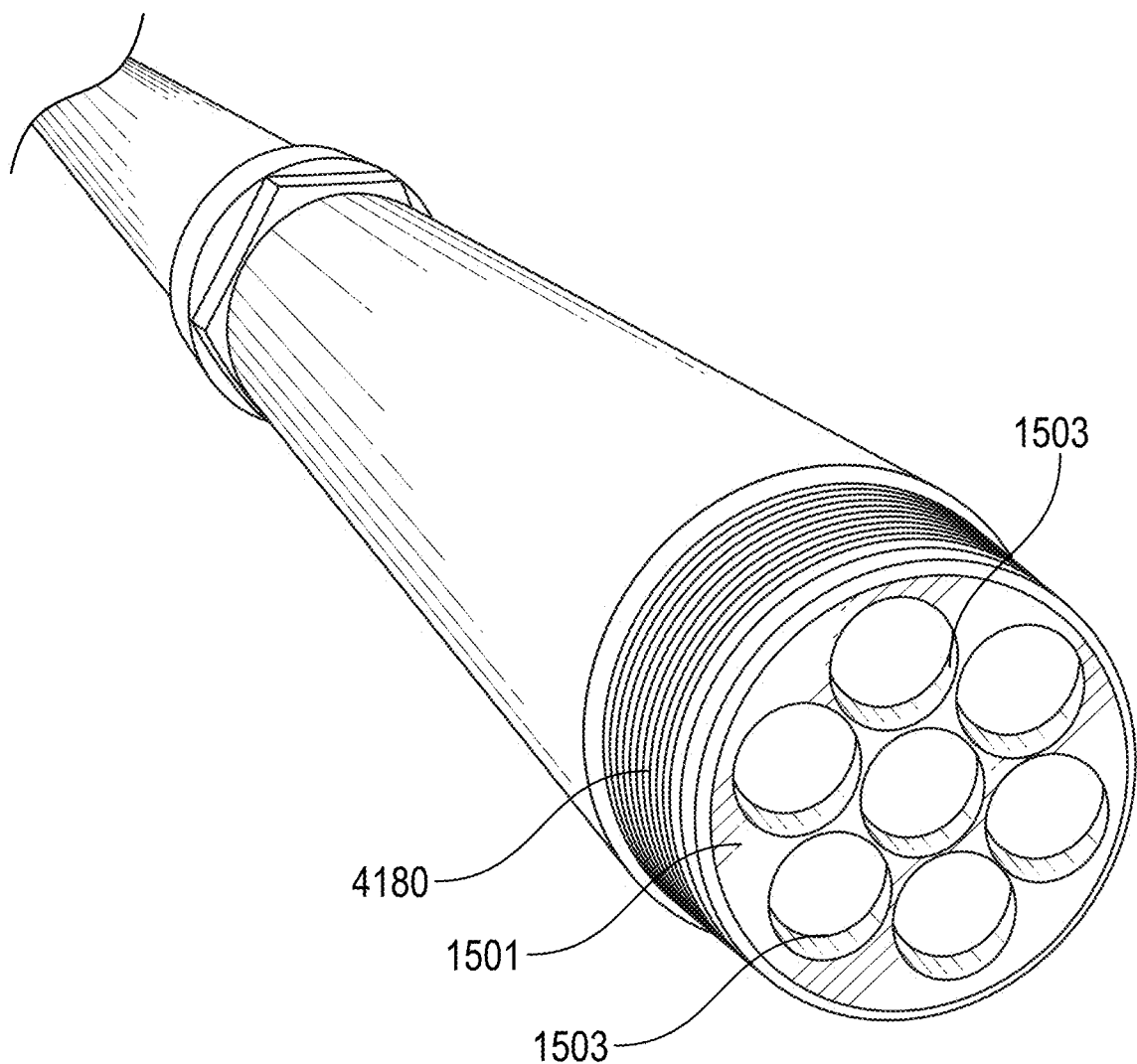
FIG. 15 is a partial perspective view of a nozzle according to aspects of the present disclosure.

Referring now to FIGS. 7-11, different views of embodiments of a cleaning apparatus 1000 are shown. FIGS. 12 and 13 are front views of a fixed end 1608 and rotating end 1610 of an actuator assembly. FIG. 14 is an isometric view of a position sensor. FIG. 15 is a partial isometric view of a nozzle 4180. Cleaning apparatus 1000 may include features of cleaning apparatus 100 described herein.

In certain embodiments, the apparatus 1000 includes an MAAA 1030. In some examples, the MAAA 1030 is similar to the MAAA 103 and includes a plurality of connected arm segments. In some examples, the MAAA 1030 includes a first arm member 1220, second arm member 1360, and third arm member 1590. In other embodiments, the MAAA 1030 may have additional or fewer arm members as desired. In various embodiments, the first arm member 1220 is secured to and extends from a plate 1240. The second arm member 1360 is attached to first arm member 1220. The third arm member 1590 is attached to second arm member 1360.

Figure 7:
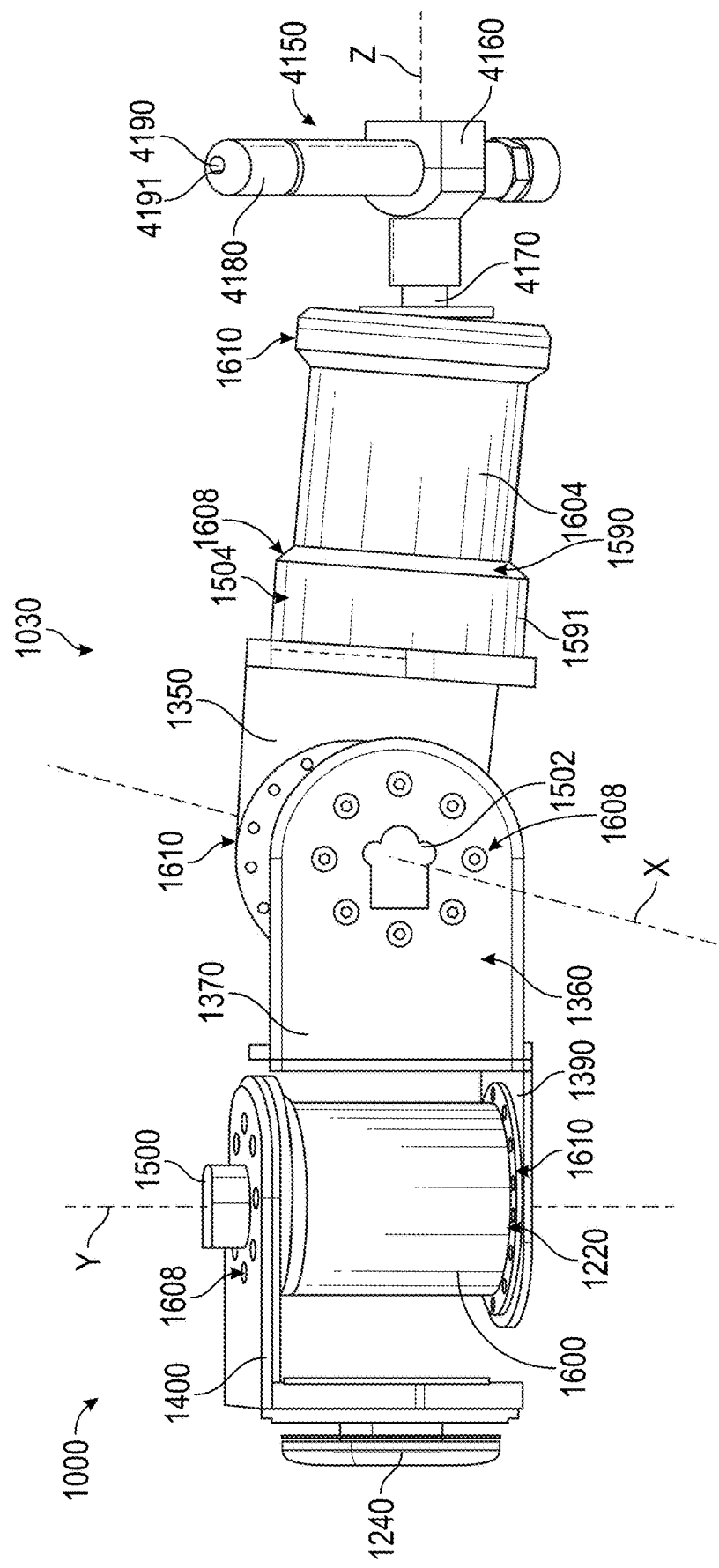
FIG. 7 is an isometric view of a cleaning apparatus according to aspects of the present disclosure.

In various embodiments, the first and second arm members 1220, 1360 may each include at least one rotatable joint such that the first and second arm members 1220, 1360 may be manipulated in multiple directions. In exemplary embodiments as illustrated in FIG. 7, the first arm member 1220 includes first and second hinge connectors 1400, 1390 interconnected via a rotatable first actuator assembly 1600. In some examples, the first hinge connector 1400 is fixedly attached to plate 1240 and the second hinge connector 1390 is rotatably attached to first actuator assembly 1600 such that second hinge connector 1390 rotates relative to plate 1240 and to first hinge connector 1400 about a first axis of rotation. As shown in FIG. 7, second hinge connector 1390 rotates about the Y-axis.

Figure 8:
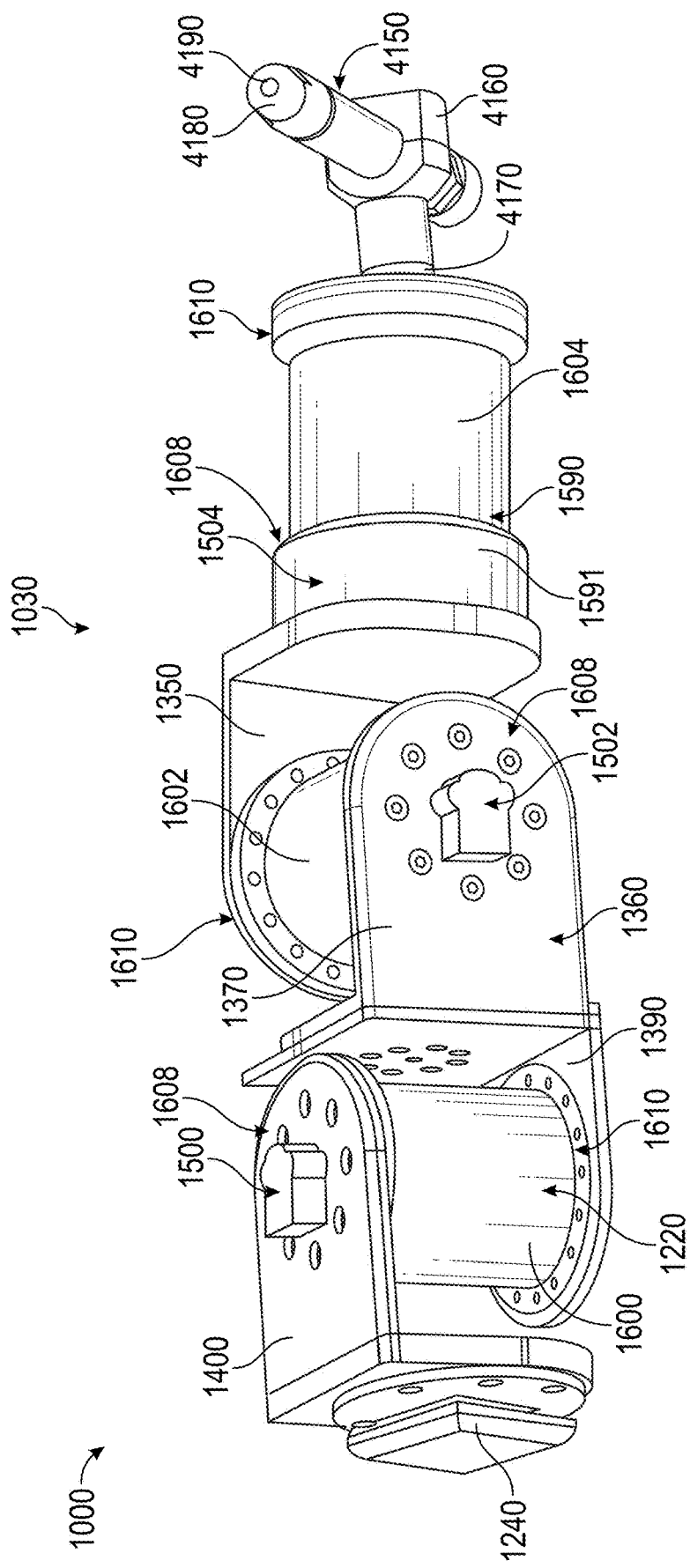
FIG. 8 is another isometric view of the cleaning apparatus of FIG. 7.
Figure 9:
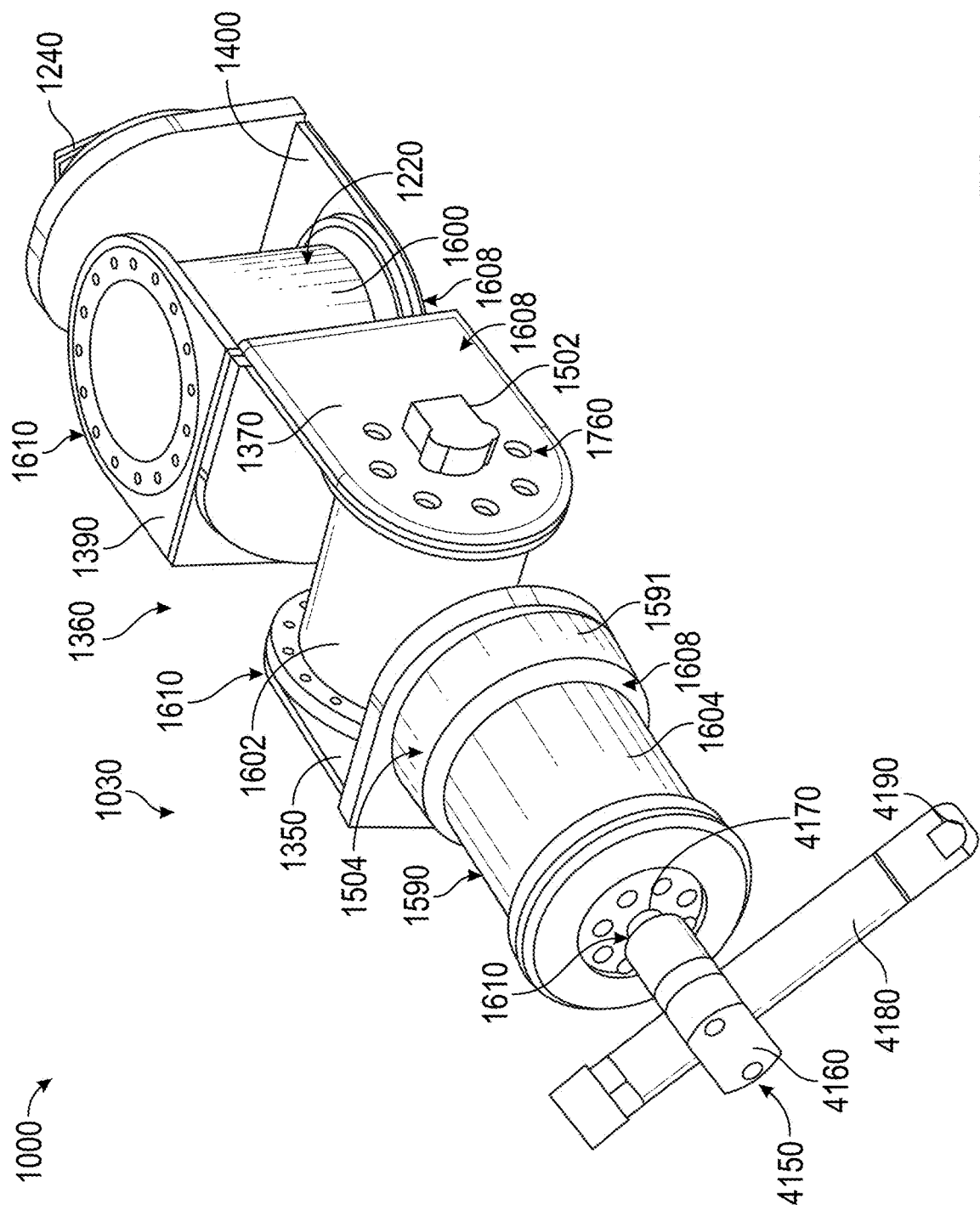
FIG. 9 is another isometric view of the cleaning apparatus of FIG. 7.

The second arm member 1360 includes third and fourth hinge connectors 1370, 1350 interconnected via a rotatable second actuator assembly 1602 as illustrated in FIG. 8. In some embodiments, the third hinge connector 1370 is fixedly attached to second hinge connector 1390 such that second arm member 1360 rotates about the same axis of rotation as the second hinge connector 1390. In various embodiments, the fourth hinge connector 1350 is rotatably attached to second actuator assembly 1602 such that fourth hinge connector 1350 rotates relative to third hinge connector 1370 and first arm member 1220 about a second axis of rotation that is substantially perpendicular to the first axis of rotation of the second hinge connector 1390. As shown in FIG. 7, the fourth hinge connector 1350 rotates about the X-axis.

As shown in FIGS. 7 and 8, the third arm member 1590 includes a housing 1591 fixedly attached to the third actuator assembly 1604. In some examples, the third actuator assembly 1604 includes a fixed end 1608 attached to the housing 1591 and a rotating end 1610 that is rotatable about a third axis of rotation (which in some embodiments, is the Z-axis) relative to the fixed end 1608. In some examples, the rotating end 1610 is attached to a shaft 4170 such that the shaft 4170 rotates about the Z-axis. In other examples, the shaft 4170 extends through the third actuator assembly 1604 and is rotatably attached to the housing 1591. In some embodiments, the housing 1591 of third arm member 1590 is fixedly attached to fourth hinge connector 1350 of second arm member 1360 such that third arm member 1590 rotates in the same second axis of rotation as fourth hinge connector 1350. As shown in FIG. 7, third arm member 1590 rotates around the X-axis. The third arm member 1590 extends away from second arm member 1360 and attaches to a shaft 4170 of a nozzle assembly 4150 as illustrated in FIG. 7.

The components of apparatus 1000 may be made of suitable materials such as composite materials, metals, and/or plastic. In one embodiment, components of apparatus 1000 may be made of aluminum to protect components within apparatus 1000 and allow for optimal rotational capabilities and functionalities of apparatus 1000. The combination of the rotation of first arm member 1220, second arm member 1360, and/or third arm member 1590 of the MAAA 1030 allows for the apparatus 1000 to be rotated about X, Y, and Z axes such that the nozzle assembly 4150 can direct a spray in a particular direction within an interior of an enclosed area. In some embodiments, first arm member 1220, second arm member 1360, and/or third arm member 1590 may include swivel connectors and/or other connections/joints/assemblies to facilitate cleaning by the apparatus 1000. In other embodiments, the number and location of the connections/joints/assemblies may be varied to achieve a desired movement of the apparatus 1000.

The nozzle assembly 4150 includes a nozzle 4180 held in place by a nozzle grip 4160 attached to the shaft 4170. In some embodiments, the nozzle assembly 4150 is configured for 360° rotation via connection of the shaft 4170 to the rotatable third actuator assembly 1604. As shown in FIG. 7, the nozzle assembly 4150 may rotate about the Z-axis.

In various embodiments, the nozzle assembly 4150 may be attached to a pressure line (not shown). The nozzle 4180 may include single and/or dual spray ends. In various examples, the nozzle 4180 may be a high pressure and/or variable speed nozzle that rotates, thereby spinning spray ends and providing single or dual rotating jets of fluids for breaking-up and fluidizing materials.

As shown in FIGS. 7-11, in some examples, the nozzle 4180 includes an end fitted with an end cap 4190 with a single fluid exit hole 4191. In other embodiments, as shown in FIG. 15, nozzle 4180 may include an end 1501 with multiple exit holes 1503 for increased flow of fluids. In some embodiments, as illustrated in FIG. 7, the end cap 4190 with the single fluid exit hole 4191 may be configured to fit onto the of nozzle 4180 having multiple exit holes to convert the multiple exit holes into a single exit hole for more direct/focused flow of fluids. Alternatively, the nozzle 4180 may include other suitable configurations designed to provide fluid at high pressures to fluidize material. As described previously, water flow may be provided at high pressures and high flow rates. Larger flow rates and pressures are possible by increasing magnetic strength, numbers, and/or configurations of components of apparatus 1000, and/or by providing additional supports for mounting apparatus 1000 against the interior wall and/or floor of the enclosed area.

In various examples, the first actuator assembly 1600, second actuator assembly 1602, and/or third actuator assembly 1604 each include a fixed end 1608 (see, e.g., FIG. 12), a rotating end 1610 (see, e.g., FIG. 13) opposite the fixed end 1608, and a shaft 4170 (or similar device) positioned within each of the first actuator assembly 1600, second actuator assembly 1602, and/or third actuator assembly 1604, respectively. A first end of shaft may interact with and/or connect to fixed end 1608 and a second end of shaft may interact with and/or connect to rotating end 1610. In some examples, and as described below, sensors may be provided on the fixed end 1608 and the rotating end 1610 of each actuator assembly. By providing some sensors on the fixed end 1608 and some sensors on the rotating end 1610, detection of relative movement between the sensors on the rotating end 1610 and on the fixed end 1608 can be used to determine rotation or movement of the arm segments.

As shown in FIG. 7, the fixed end 1608 of the first actuator assembly 1600 is attached to a surface of first hinge connector 1400 and the rotating end 1610 of the first actuator assembly 1600 is attached to a surface of the second hinge connector 1390. In this embodiment, the fixed end 1608 of the second actuator assembly 1602 is attached to a surface of the third hinge connector 1370 and the rotating end 1610 of the second actuator assembly 1602 is attached to a surface of the fourth hinge connector 1350. In this embodiment, the fixed end 1608 of the third actuator assembly 1604 is attached to the housing 1591 and the rotating end 1610 of the third actuator assembly 1604 is attached to the shaft 4170 of the nozzle assembly 4150. In other examples, the shaft 4170 may extend to the housing 1591 and is rotatably attached to the housing 1591.

In various embodiments, multiple sensors may be affixed to the exterior and/or interior of the MAAA 1030 to detect the positioning and location of components of the MAAA 1030, including but not limited to the first arm member 1220, second arm member 1360, third arm member 1590, and/or nozzle assembly 4150. As illustrated in FIGS. 7 and 8, in certain embodiments, a first external sensor 1500 and a second external sensor 1502 may be attached to an exterior surface of the first hinge connector 1400 and third hinge connector 1370, respectively, such that they interface with the fixed end 1608 of each of the first actuator assembly 1600 and second actuator assembly 1602, respectively. In this embodiment, a first internal sensor 1504 may be installed within housing 1591 such that it interfaces with fixed end 1608 of third actuator assembly 1604. However, in other embodiments, the first external sensor 1500, second external sensor 1502, and/or first internal sensor 1504 may be attached to other suitable exterior and/or interior areas of MAAA 1030.

In exemplary embodiments, the first external sensor 1500, second external sensor 1502, and/or first internal sensor 1504 may be rotary angle/position sensors such as the RS53 Rotary Position Sensors provided by the Parker Harmifin Corporation, as illustrated in FIG. 14, or various other suitable sensors for detecting rotation and/or a position of the arm segments. While the sensor illustrated in FIG. 14 is illustrated for use as the first external sensor 1500, it may also be used for the second external sensor 1502 and/or first internal sensor 1504. In some examples, the first external sensor 1500, second external sensor 1502, and/or first internal sensor 1504 may be analog output, non-contacting ferrous sensors with an angular range of up to 360 degrees. In various examples, the first external sensor 1500, second external sensor 1502, and/or first internal sensor 1504 may utilize Hall Effect technology and may be customized in a single package to reduce rotary alignment issues and variations in signals caused by vibration and axial variations. Hall Effect sensors are transducers that vary their output voltage in response to a magnetic field, and are commonly used for proximity switching, positioning, speed detection, and other sensing applications.

Referring to FIG. 14, the first external sensor 1500 is illustrated. In various examples, the second external sensor 1502 and/or the first internal sensor 1504 may have a configuration similar to that of the first external sensor 1500 illustrated in FIG. 14. As shown in FIG. 14, the first external sensor 1500 may include a rotating keyhole A, which is configured to rotate during rotation of components of the MAAA 1030 (e.g., including the first arm member 1220, second arm member 1360, and/or third arm member 1590, respectively) via connection to a shaft of the first, second, and third actuator assemblies 1600, 1602, 1604 respectively.

In particular embodiments, the first and second external sensors 1500, 1502 may each be attached to each of the first and second arm members 1220, 1360, respectively, such that a first end of the shaft 4170 of each of the first and second actuator assemblies 1600, 1602 is inserted through the fixed end 1608 of each of the first and second actuator assemblies 1600, 1602, respectively, and into the rotating keyhole A of each of the first and second external sensors 1500, 1502, respectively.

In some examples, the first internal sensor 1504 may be installed within the housing 1591 and attached to the third actuator assembly 1604 such that the shaft 4170 is inserted into the rotating end 1610 of the third actuator assembly 1604, through the fixed end 1608 of the third actuator assembly 1604, and into the rotating keyhole A of the first internal sensor 1504.

According to various embodiments and as illustrated in FIG. 14, the first external sensor 1500 may also include power and communication wires 1510 used to provide a signal from the first external sensor 1500 (and/or second external sensor 1502 and/or first internal sensor 1504) to other components, such as a PLC device used to program and/or control movement of the MAAA 1030. Particularly, signals from the sensor 1500 may include accurate readings of the positioning of components of the MAAA 1030, thereby allowing for more optimized automated movement of the MAAA 1030 within the enclosed area to be cleaned.

Embodiments of the MAAA 1030 described herein may allow for 360° rotation of movement of each of the first, second, and third actuator assemblies 1600, 1602, 1604, as well as the nozzle 4180 attached to the third actuator assembly 1604, via connections to the control lines 1340, 1380. See FIGS. 10 and 11.

The control lines 1340, 1380 are configured to control movement, such as rotation of the first, second, and/or third arm members 1220, 1360, 1590 via pneumatics, electronics, hydraulics, or other applicable combinations thereof. As illustrated in FIGS. 10 and 11, the control lines 1340, 1380 may be directly connected to each of the first, second, and third actuator assemblies 1600, 1602, 1604, and the control components within and attached to the first, second, and third actuator assemblies 1600, 1602, 1604 described herein.

In an exemplary embodiment, the control lines 1340, 1380 may utilize a wireless/radio signal to control movement of the first, second, and/or third arm members 1220, 1360, 1590. In this embodiment, a transmitter, such as a transmitter within mobile operating device (or other suitable devices or transmitters) may send a signal to a receiver configured to control various components of the system, including but not limited to an Electro-Hydraulic Flow Control (EHFC) device connected to the apparatus 1000 via the control lines 1340, 1380. In some embodiments, repeaters may be added to extend the range of the radio signal over longer distances.

In other embodiments, the control lines 1340, 1380, including power and communication wires 1510 of the first external sensor 1500, second external sensor 1502, and/or first internal sensor 1504, may be used to send positioning data of components of the MAAA 1030 from the first external sensor 1500, second external sensor 1502, and/or first internal sensor 1504 to a PLC device used to program and/or control movement of the MAAA 1030. As will be further described herein, the apparatus 1000 may then be controlled manually or from pre-programmed algorithms through the PLC device such that components of apparatus 1000 are movable through multiple directions and axes within an enclosed area to allow for more focused cleaning of surfaces of the enclosed area.

Similar to the apparatus 100, the apparatus 1000 may be remotely controlled by an operator at a control station external to the enclosed area. The control station may be a stationary or non-stationary structure. The control station may be operatively connected to the apparatus 1000 and transmit signals to the apparatus 1000 via the control lines 1340, 1380 based on the operator's input at the control station. In embodiments, a camera may be attached to the enclosed area prior to the apparatus 1000 being mounted to the enclosed area, or may be attached to apparatus 1000 prior to mounting. A display device may also be provided at the control station so that the operator may monitor the apparatus 1000 inside the enclosed area via the camera and make any necessary adjustments to the apparatus 1000.

Referring back to FIG. 4, a cleaning and track system 400 is shown. The cleaning and track system 400 may include the cleaning apparatus 100 and/or cleaning apparatus 1000 attached to a track/drive system 414 and/or to a mounting support structure 415, whereby the apparatus 100 and/or track/drive system 414 may be movable through multiple axes within the enclosed area. In various embodiments, the cleaning and track system 400 may be automated and/or remotely operable. In some examples, the cleaning and track system 400 may be controlled via hydraulic, pneumatic, and/or electrical methods.

In the embodiment illustrated in FIG. 4, the cleaning and track system 400 includes the cleaning apparatus 100 with the MAAA 103 having the first arm member 122 and the second arm member 136. The MAAA 103 is connected to a single high pressure water nozzle 418 configured to provide for additional impact force at the area being cleaned. Alternatively, the MAAA 103 may be connected to the nozzles 110 described herein or other configurations of nozzles 110.

In some embodiments, the cleaning apparatus 100 is attached to the track/drive system 414. In some examples, the track/drive system 414 includes a first support 416 and a second support 417. The first support 416 includes covers 421 that at least partially surround a rod 419. Although two covers 421 are illustrated, in other examples, any number of covers 421 may be provided, including a single cover 421 (e.g., two covers formed as a unitary component) or more than two covers 421. The covers 421 may be spaced apart by a gap 302 that is configured to accommodate movement of a first trolley unit 450 along the rod 419. As such, in various examples, the covers 421 may have a generally inverted U-shape, a generally inverted V-shape, curved hook, L-shaped, T-shaped, or various other suitable shapes as desired.

Similar to the first support 416, the second support 417 includes covers 422 that at least partially surround a rod 420. Like the covers 421, the number or shape of the covers 422 should not be considered limiting on the current disclosure. Similar to the first support 416, the covers 422 of the second support 417 may be spaced apart by a gap 304 that is configured to accommodate movement of a second trolley unit 451 along the rod 420.

In certain examples and as illustrated in FIG. 4, the first support 416 extends in a direction (e.g., along an X-axis) that is substantially perpendicular to a direction (e.g., along a Y-axis) in which the second support 417 extends, although it need not. For example, in other embodiments, the first support 416 may be at other angular orientations relative to the second support 417 as desired.

As described previously, the first support 416 includes the rod 419 and the second support 417 includes the rod 420. In some examples, the rods 419, 420 include threading that threadbly engages with the trolleys 450, 451, respectively, although it need not. In some examples, the rods 419 and 420 are rotatably supported within the first support 416 and the second support 417, respectively. As illustrated in FIG. 4, in some examples, the rod 419 may be rotatable about the X-axis (or the axis along which the first support 416 extends) and the rod 420 may be rotated about the Y-axis (or the axis along which the second support 417 extends). In various examples, the first support 416 includes a first motor 306 that is configured to rotate the rod 419 and the second support 417 includes a second motor 308 that is configured to rotate the rod 420. In various other examples, other suitable mechanisms for rotating the rods 419, 420 (e.g., hydraulic, pneumatic, and/or electrical power, etc.) may be utilized. As described below, through rotation of the rods 419, 420, the trolleys 450, 451 may be moved linearly along the rods 419, 420, respectively. In certain examples, nuts, bolts, pins, ribs, or various other suitable mechanisms may be provided to limit the rotation of each of the rods 419, 420.

The cleaning apparatus 100 is attached to the first support 416 such that the cleaning apparatus 100 may be movable and/or driven along the length of the first support 416. The cleaning apparatus 100 may be magnetically attached to the first support 416 or attached via the first trolley unit 450 as described herein. Alternatively, the cleaning apparatus 100 may be attached to the first support 416 via other attachment mechanisms. The apparatus 100 may be remotely controlled and mechanically driven along first support 416. As shown in FIG. 4, in some non-limiting examples, the cleaning apparatus 100 is movable along the X-axis.

In various embodiments, the first support 416 is attached to second support 417 such that the first support 416 may be movable and/or driven along the length of the second support 417. The first support 416 may be magnetically attached to second support 417 or attached via the second trolley unit 451 as described herein. Alternatively, the first support 416 may be attached to the second support 417 via other attachment mechanisms. The first support 416 may be remotely controlled and mechanically driven. As shown in FIG. 4, the first support 416 and attached cleaning apparatus 100 are movable along the Y-axis.

FIGS. 4A and 4B show enlarged cutaway views of the trolleys 450, 451. In some examples, the apparatus 100 is attached to the first trolley unit 450, although it need not be. Referring to FIG. 4A, the first trolley unit 450 includes an attachment portion 310 that is threadably engaged with the rod 419 such that rotation of the rod 419 linearly moves the first trolley unit 450 along the rod 419. The attachment portion 310 is connected to a base portion 312 of the first trolley unit 450. In some examples, when the first trolley unit 450 is supported on the rod 419, the attachment portion 310 may extend through the gap 302. The base portion 312 of the first trolley unit 450 may support the apparatus 100 through various suitable permanent or non-permanent mechanisms including, but not limited to, screws, pins, hooks, bolts, adhesives, welding, or various other suitable mechanisms. In some non-limiting examples, the attachment portion 310 includes a plate 318 extending from the base portion 312 and having a cylindrical rod-receiving portion 316. When the first trolley unit 450 is mounted on the rod 419, the rod 419 may extend through the cylindrical rod-receiving portion 316. In other examples, the attachment portion 310 may have various other components and/or configurations suitable for threadably supporting the first trolley unit 450 on the rod 419. Through the first trolley unit 450, the apparatus 100 is movable along the X-direction defined by the first support 416.

Referring to FIG. 4B, the second trolley unit 451 is shown. Second trolley unit 451 is attached to first support 416 at a first end and second support 417 at a second end. Similar to the first trolley unit 450, the second trolley unit 451 includes an attachment portion 320 and a base portion 322. The attachment portion 320 is threadably engaged with the rod 420 such that rotation of the rod 420 linearly moves the second trolley unit 451 along the rod 420. In some examples, when the second trolley unit 451 is supported on the rod 420, the attachment portion 320 extends through the gap 304. The base portion 322 may support the first support 416 through various suitable permanent or non-permanent mechanisms including, but not limited to, screws, pins, hooks, bolts, adhesives, welding, or various other suitable mechanisms. In some non-limiting examples, the attachment portion 320 includes a plate 324 extending from the base portion 322 and having a cylindrical rod-receiving portion 326. When the second trolley unit 451 is mounted on the rod 420, the rod 420 may extend through the cylindrical rod-receiving portion 326. In other examples, the attachment portion 320 may have various other components and/or configurations suitable for threadably supporting the second trolley unit 451 on the rod 420. Through the second trolley unit 451, the first support 416 (and thus the apparatus 100) is movable along the Y-direction defined by the second support 417.

Although not shown in this configuration, the rods 419, 420 may be movably attached within the first and second supports 416, 417 via other suitable mechanisms so as to allow for lateral movement of rods 419, 420 within the first and second supports 416, 417. In some embodiments, the first and second supports 416, 417 may be attached to each other via magnets. Magnets may be permanent magnets or electromagnets. In other embodiments, the first and second supports 416, 417 may be attached to each other via other temporary or permanent attachment mechanisms.

In some embodiments, opposing ends of the first and second supports 416, 417 may be supported on a wall or other structure via magnets or other temporary or permanent attachment mechanisms. In embodiments, the first support 416 may be pre-mounted to an interior surface of a container and the second support 417 may be subsequently inserted into the container and mounted onto the first support 416.

The cleaning and track system 400 may be attached to a mounting support structure 415 via magnets or other temporary or permanent attachment mechanisms. In various embodiments, the cleaning and track system 400 may be strategically placed within an enclosed area according to any specific positioning required for comprehensive movement. In exemplary embodiments, the mounting support structure 415 is a longitudinal I-beam. However, the mounting support structure 415 may be a rounded rod/bar and/or have other shapes suitable for attachment of the cleaning and track system 400. As shown in FIG. 4, the second support 417 may extend in a direction perpendicular to the mounting support structure 415, although in other embodiments, the second support 417 may be at any suitable angular configuration relative to the mounting support structure 415. In examples where the second support 417 is perpendicular to the mounting support structure 415, the cleaning apparatus 100 and the MAAA 103 may move in a multitude of directions within the enclosed area—including but not limited to horizontal, vertical, circular, and/or spiral directions so as to cover any and all enclosed areas. In some embodiments, the mounting support structure 415 may be mounted within an interior of the enclosed area. In other embodiments, the mounting support structure 415 may be lowered or inserted into any area to be cleaned, including manholes.

Depending on the configuration of an area to be cleaned, multiple different arrangements of the track system 400 and/or mounting support structure 415 are possible. Although disclosed as being connected perpendicularly, the first and second supports 416, 417 and the mounting support structure 415 may be attached to each other in other configurations necessary to assist apparatus 100 in performing its cleaning functions. In embodiments, each component of the cleaning and track system 400, including cleaning apparatus 100, first support 416, and second support 417, as well as mounting support structure 415 may be separately mounted within or outside a container, and/or may be maneuvered into the container as separate components or as a pre-mounted system/apparatus prior to cleaning. For example, in some embodiments, the track/drive system 414 may be mounted within a container, and the apparatus 100 may be lowered into the container and attached to the track/drive system 414. In other embodiments, the apparatus 100 may be mounted within the container and the track/drive system 414 may be lowered into the container and attached to the apparatus 100. In yet other embodiments, the first support 416 of track/drive system 414 may be mounted within the container and the second support 417 of track/drive system 414 may be lowered into the container and attached to the first support 416. In some embodiments, the mounting support structure 415 may be mounted within the container and the track system 400 and/or its individual components may be lowered into the container and attached to the mounting support structure 415.

FIGS. 16-20 illustrate another embodiment of a cleaning and track system 4000. In various embodiments, the cleaning and track system 4000 may include the cleaning apparatus 100 and/or cleaning apparatus 1000 disclosed herein attached to a track/drive system 4140, whereby the apparatus 100, 1000 and/or the track/drive system 4140 may be movable through multiple axes within an enclosed area. Cleaning and track system 4000 may be automated and/or remotely operable. Cleaning and track system 4000 may be controlled via hydraulic, pneumatic, and/or electrical methods.

In various embodiments, the cleaning and track system 4000 may be configured to be mounted outside a tank and/or enclosed area to be cleaned to reduce and/or eliminate entry into the enclosed area. Components of the cleaning and track system 4000, including the apparatus 1000 and/or the track/drive system 4140, may be mounted within an interior 4003 of the container 4001 prior to cleaning, and/or lowered or inserted into any area to be cleaned, including through manholes or openings 4007 in the container 4001. See FIGS. 19 and 20. Cleaning and track system 4000 may be configured to be easily moved between different areas that require cleaning. Cleaning and track system 4000 may be strategically placed according to any specific positioning required for comprehensive movement within an enclosed area.

Figure 16:
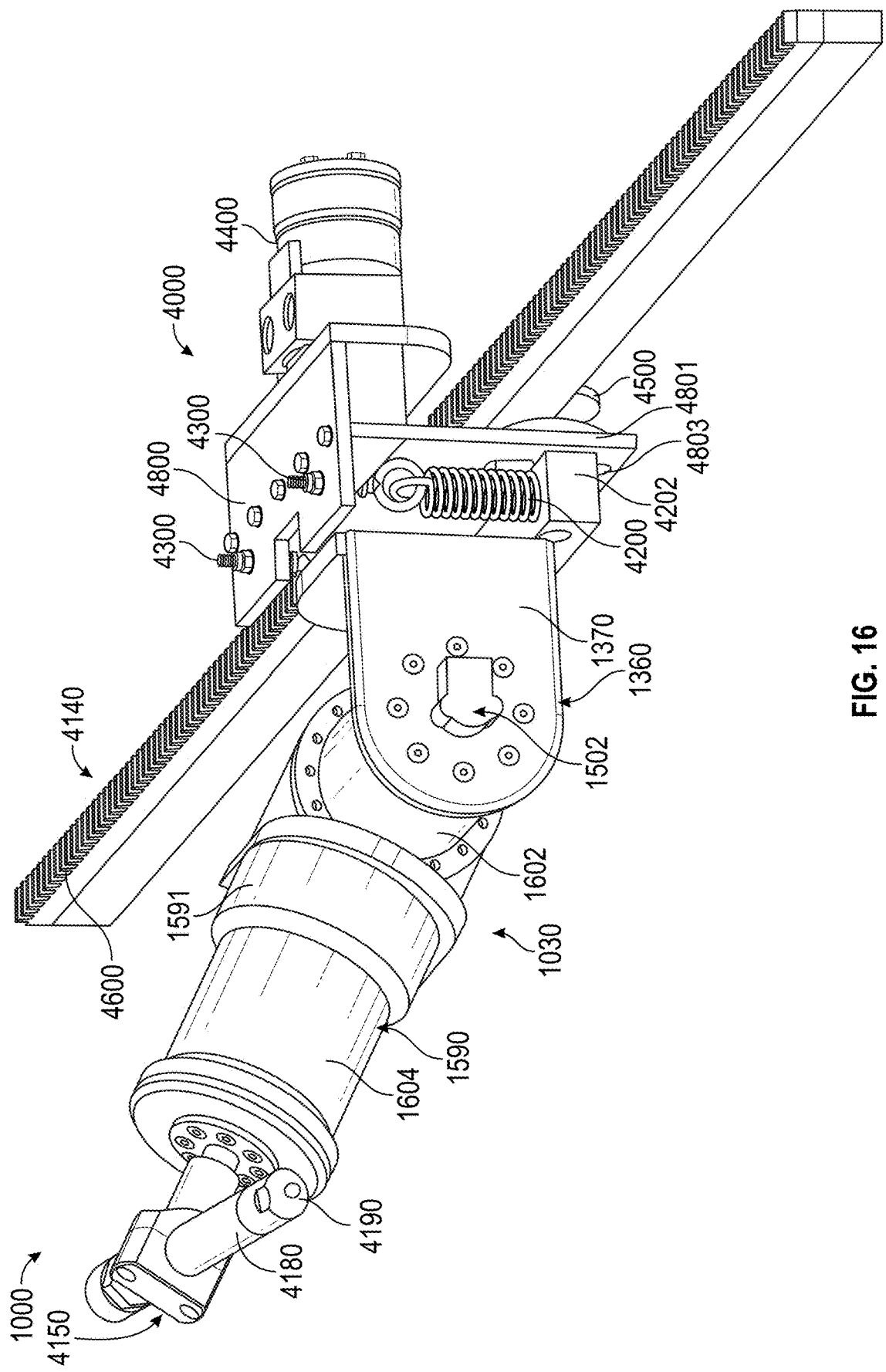
FIG. 16 is an isometric view of a cleaning and track system according to aspects of the present disclosure.

As shown in FIG. 16, in one embodiment, the cleaning and track system 4000 includes the cleaning apparatus 1000 with the MAAA 1030 having a second arm member 1360 and third arm member 1590. The MAAA 1030 includes the nozzle 4180 of the nozzle assembly 4150 configured to provide for additional impact force at the area being cleaned. In alternative embodiments, the cleaning and track system

4000 may also include the first arm member 1220 to provide for additional angles of rotation of the MAAA 1030.

Cleaning apparatus 1000 is attached to a track/drive system 4140. Track/drive system 4140 includes a track/drive member 4800. As shown in FIG. 16, the track/drive member 4800 may be attached to apparatus 1000 and to a bi-directional hydraulic drive motor 4400. In exemplary embodiments, the track/drive member 4800 may be configured to interface with and/or attach to a gear track 4600 such that track/drive member 4800 may be movable and/or driven along the length of the track 4600.

As shown in FIG. 16, track/drive member 4800 may be attached to the third hinge connector 1370 of the apparatus 1000. Alternatively, the track/drive member 4800 may be attached to the first hinge connector 1400 of the first arm member 1220 and/or directly to the third arm member 1590.

Hydraulic motor 4400 in the track/drive system 4140 may be configured to facilitate movement of, and/or drive, the track/drive member 4800 along the track 4600. Although shown as a hydraulic motor, the motor 4400 may include other types of drive motors including, but not limited to, electric motors used to facilitate movement of the track/drive member 4800 along the track 4600.

Figure 17:
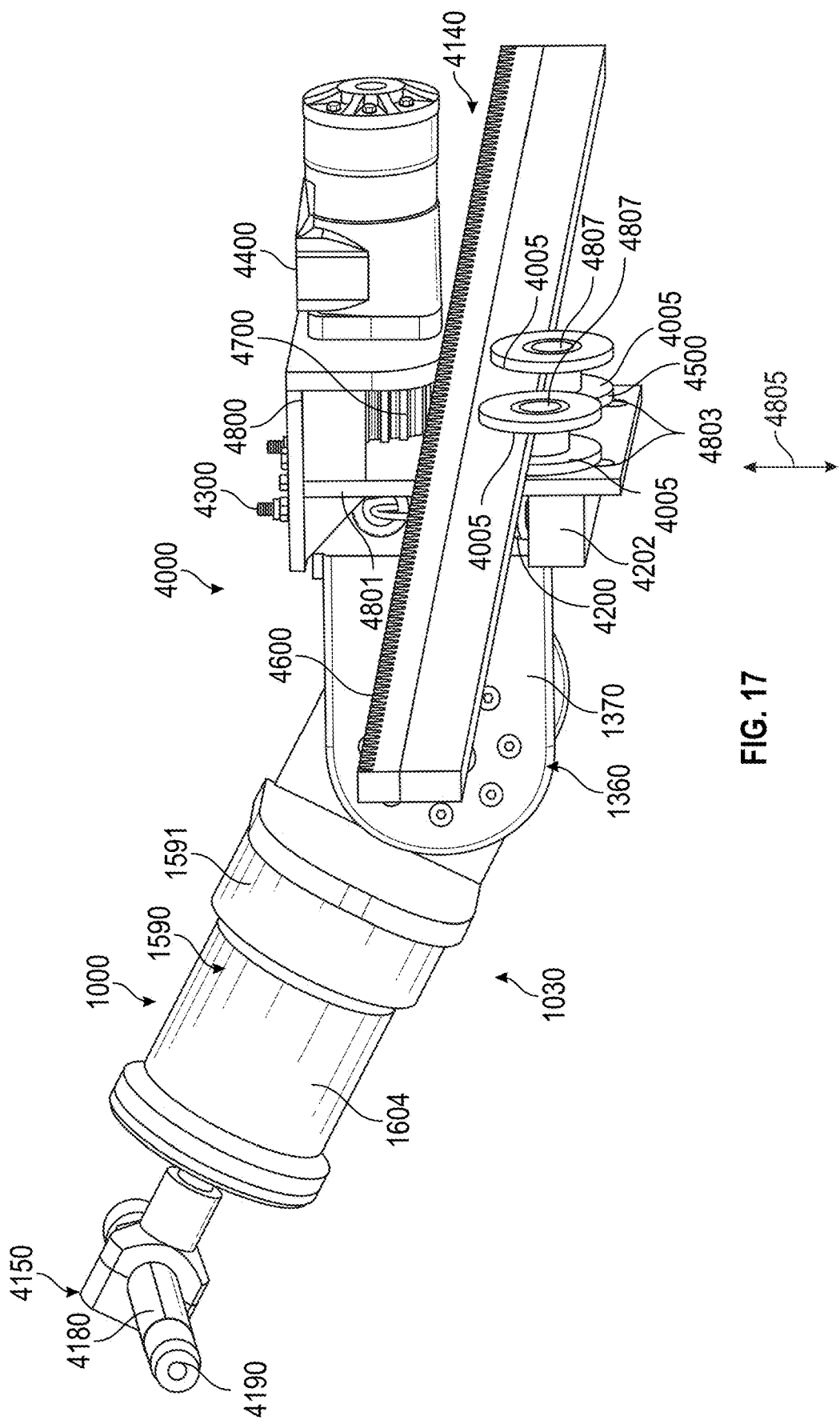
FIG. 17 is another isometric view of the cleaning and track system of FIG. 16.
Figure 18:
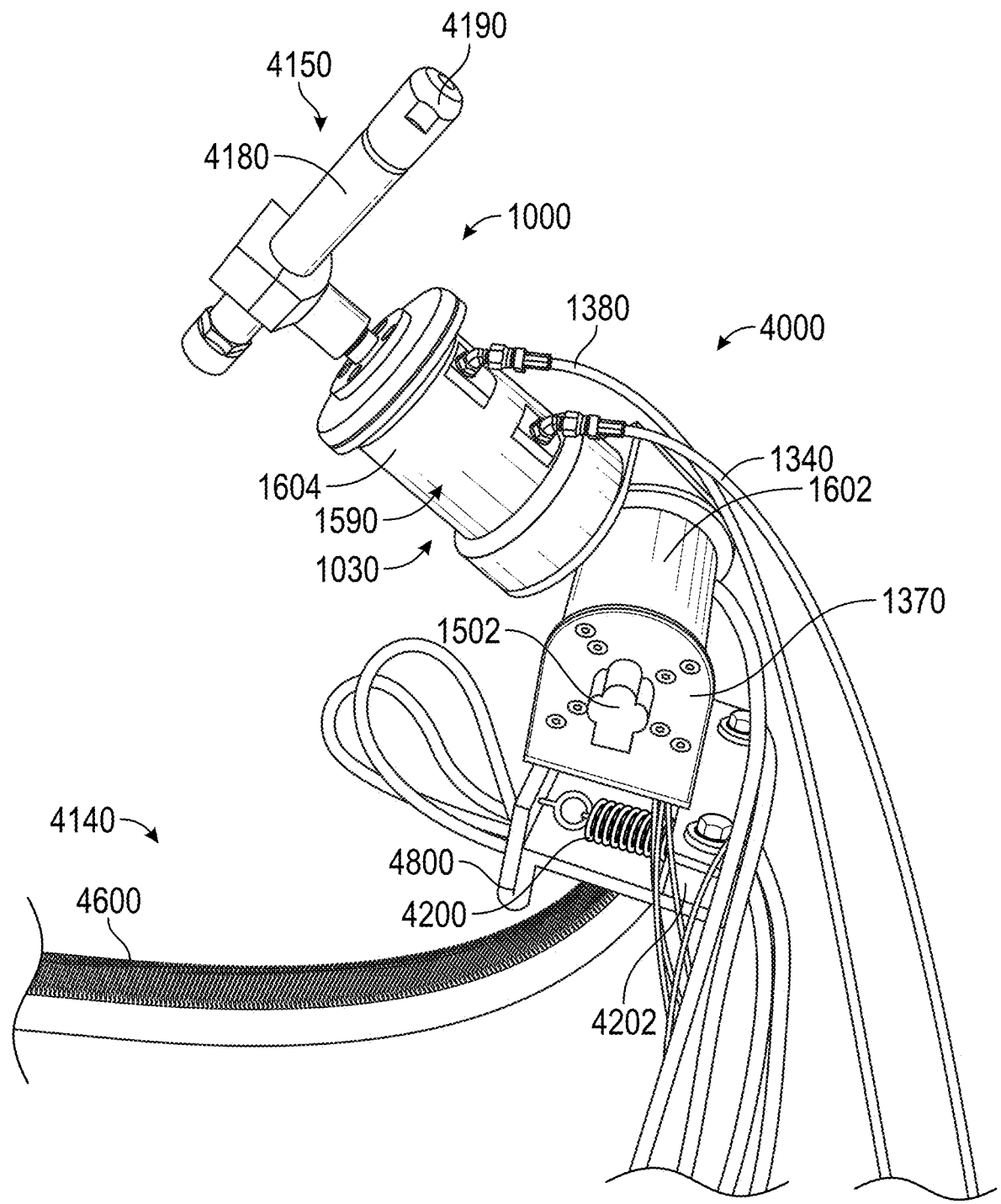
FIG. 18 is another isometric view of the cleaning and track system of FIG. 16.

As shown in FIG. 17, the hydraulic motor 4400 may be attached to the track/drive member 4800 such that a gear 4700 of the motor 4400 may interface/interact with the track 4600. In some embodiments, the track 4600 may function as a gear track having teeth equally spaced along the track 4600 such that when the gear 4700 is placed on top of the track 4600 and rotated (via activation of hydraulic motor 4400), the linear nature of the track 4600 converts the rotary motion of the gear 4700 into linear motion—thereby driving the track/drive member 4800 and/or attached apparatus 1000 along track 4600.

In exemplary embodiments, the track 4600 is made of steel and welded to an I-beam. In alternative embodiments, the track 4600 may be made of other suitable materials to assist the track/drive member 4800 and/or the attached apparatus 1000 to move/drive along the track 4600.

Figure 19:
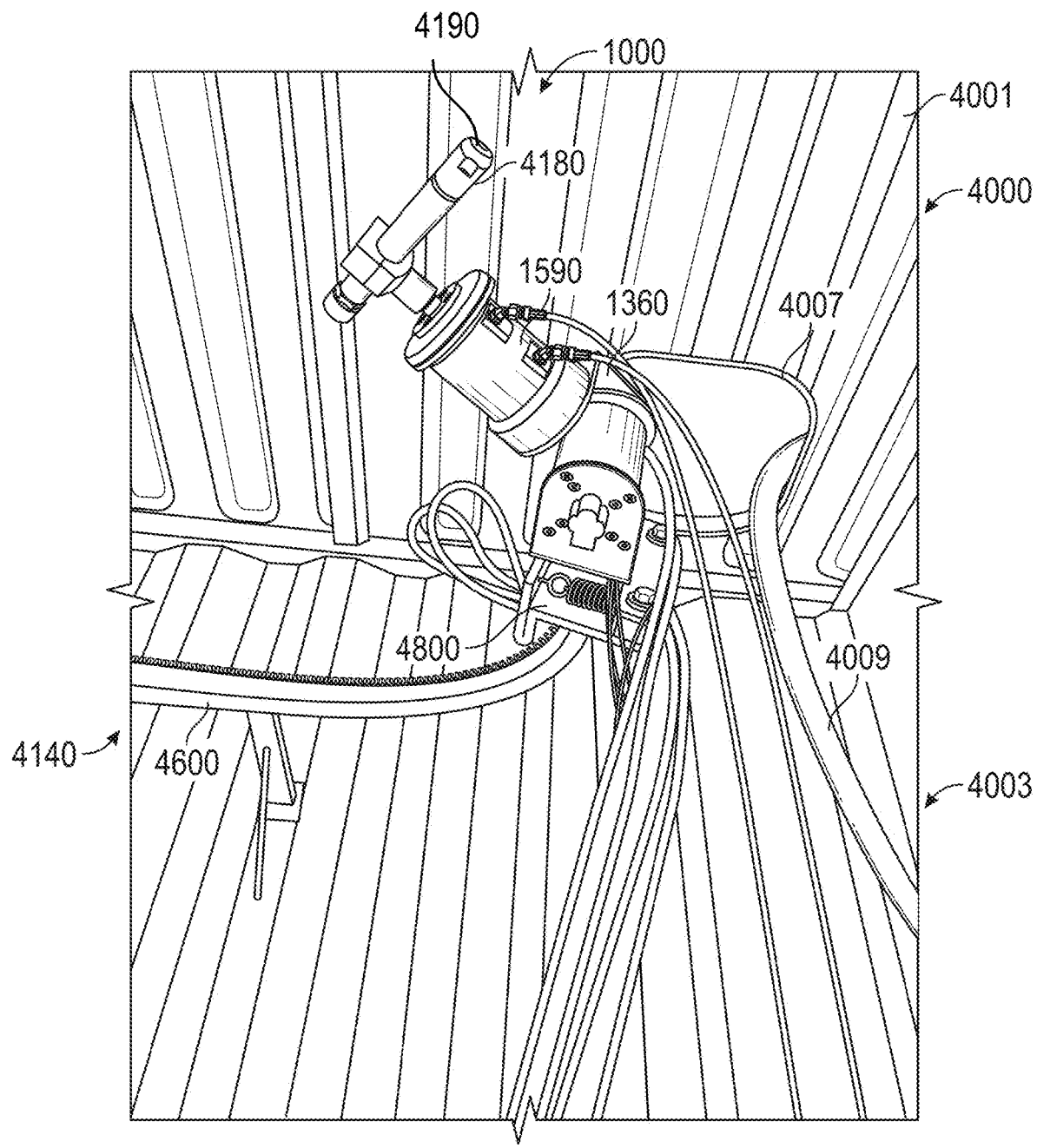
FIG. 19 is a partial perspective view of the cleaning and track system of FIG. 16 within a container.
Figure 20:
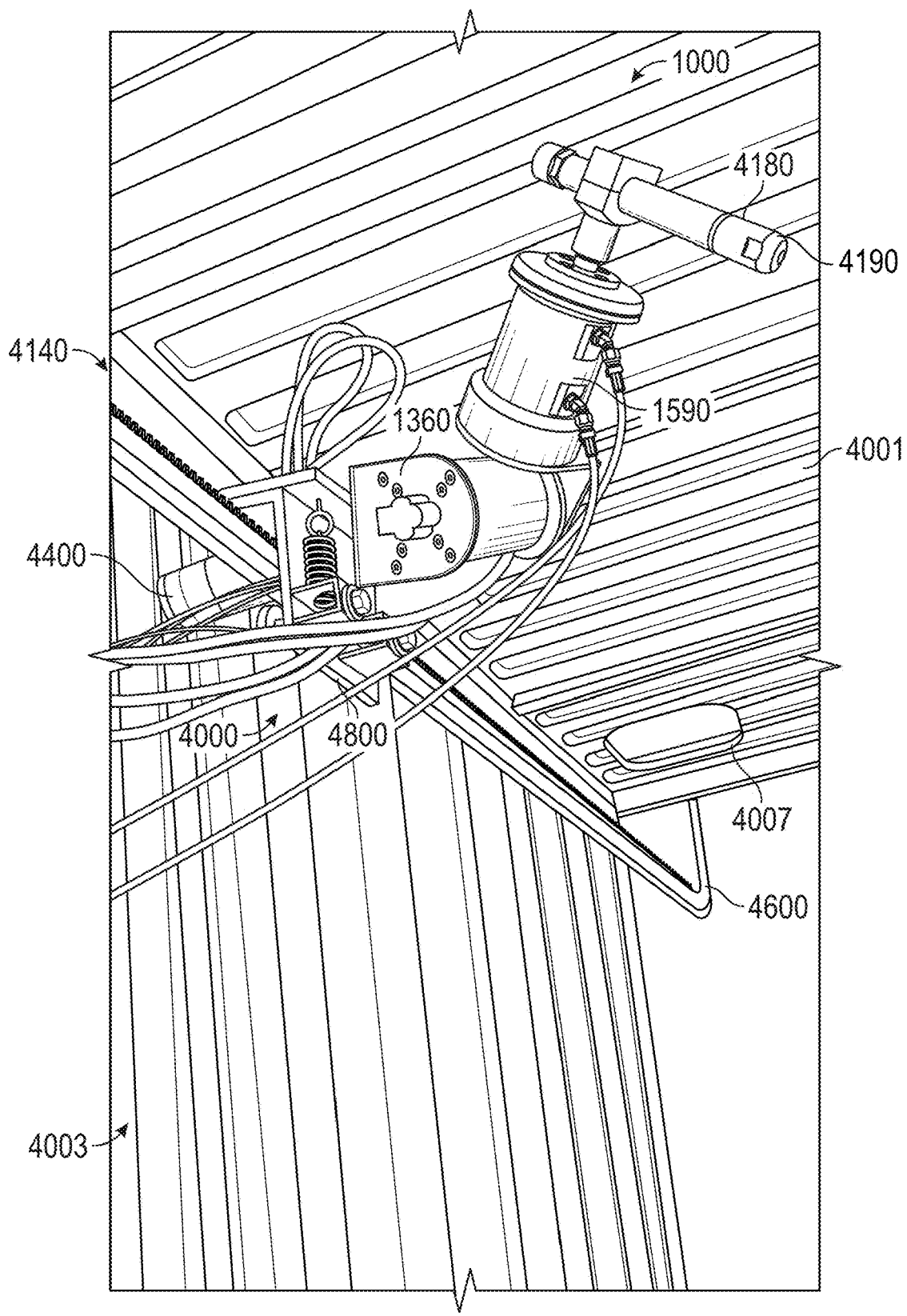
FIG. 20 is another partial perspective view of the cleaning and track system of FIG. 16 within the container of FIG. 19.
Figure 21:
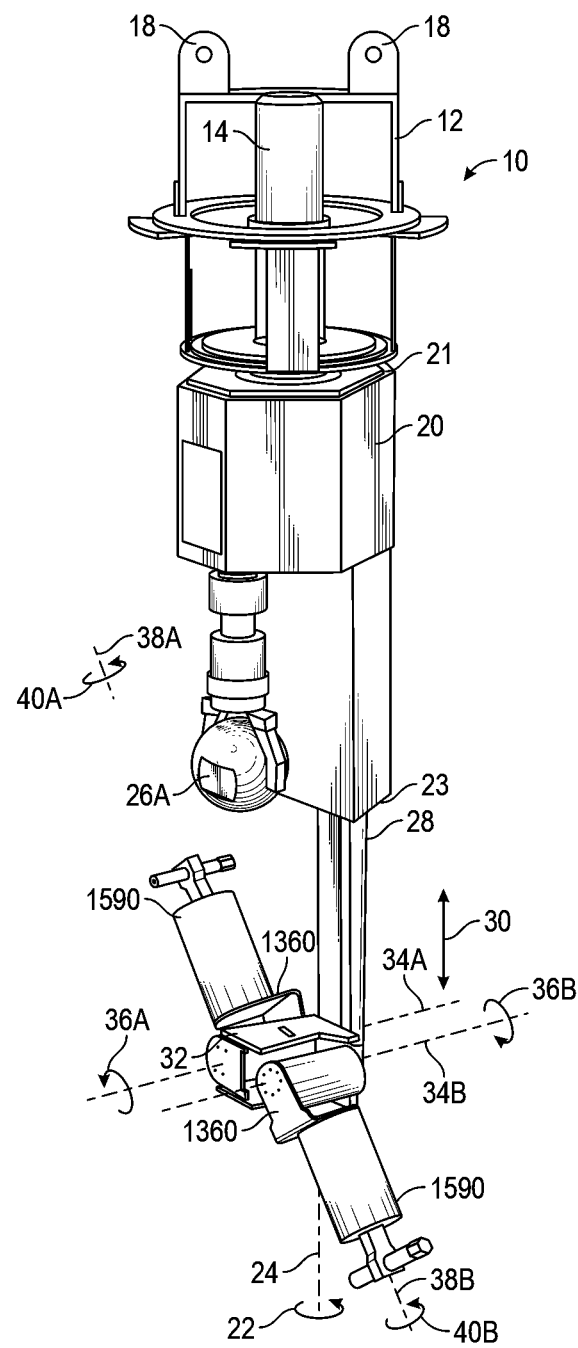
FIG. 21 is a perspective view of a cleaning system according to aspects of the present disclosure.
Figure 22:
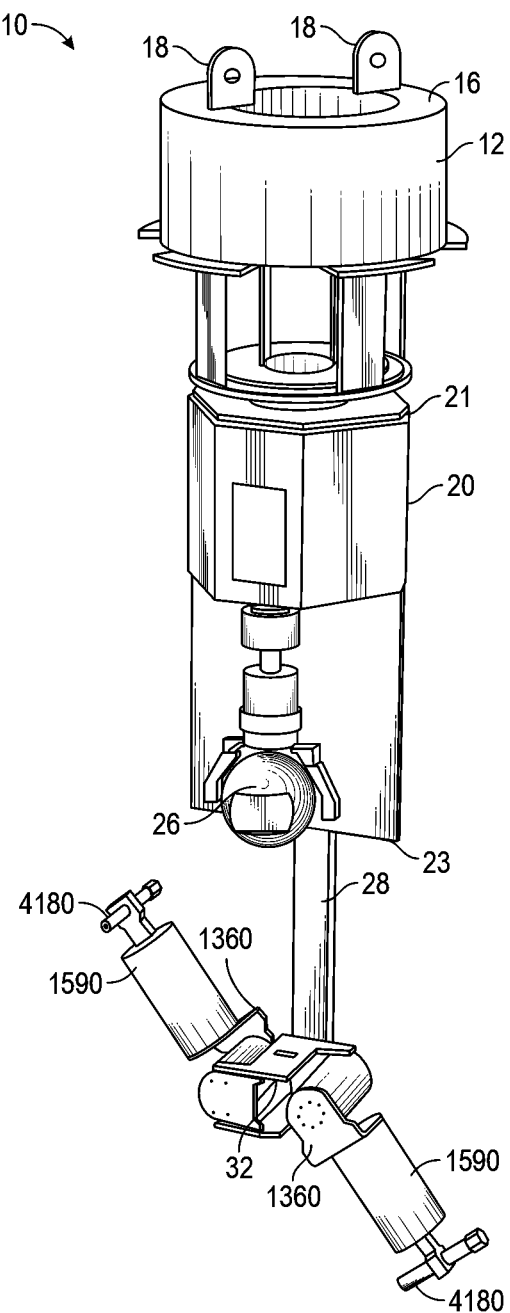
FIG. 22 is another perspective view of the cleaning system of FIG. 21 with a cover.
Figure 23:
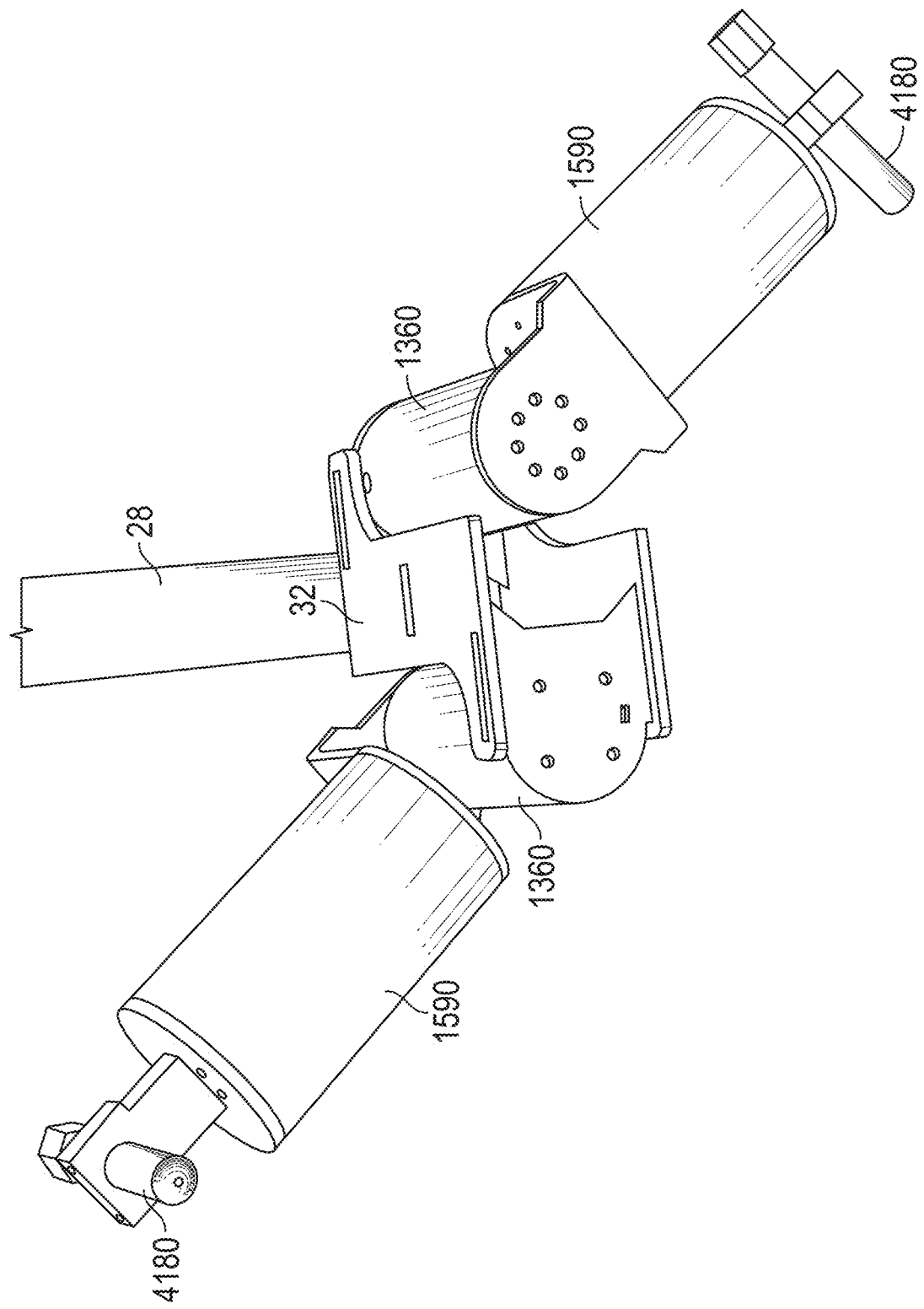
FIG. 23 is an enlarged perspective view of a cleaning apparatus of the cleaning system of FIG. 21.

The track 4600 may be configured/positioned in a horizontal, vertical, or other suitable manner to allow cleaning and track system 4000 to move in a multitude of directions within an enclosed area—including but not limited to horizontal, vertical, circular, and/or spiral directions so as to cover any and all enclosed areas. In some examples, the track 4600 may be permanently mounted (natively or through retrofitting) on the container 4001 or other item to be cleaned through various suitable mechanisms including, but not limited to welding, bolts, screws, pins, adhesives, cements, or various other suitable mechanisms. For example, FIG. 19 illustrates the track 4600 mounted on the container 4001 through welding. Alternatively, the track 4600 may be removably mounted on the container 4001 (e.g., may be removed before and after cleaning) through various suitable mechanisms including, but not limited to, magnets, clips, clasps, hooks, pins, screws, bolts, or various other suitable mechanisms.

The track/drive member 4800 includes a base 4801 defining wheel slots 4803. In various embodiments, the track drive member 4800 includes wheels 4500, such as at least two wheels 4500, which may also be installed with track/drive member 4800 so as to interact with track 4600 opposite from the gear 4700/track 4600 connection described herein. See FIG. 17. In other words, the track 4600 is between the wheels 4500 and the gear 4700 during use. Wheels 4500 may be configured to facilitate movement of the track/drive system 4140 and attached apparatus 1000 within enclosed area. Each wheel 4500 includes a wheel shaft 4807 that extends through the wheel slots 4803 and connects to a spring block 4202. In various examples, the wheel slots 4803 are elongated such that the wheels 4500 are individually movable (arrow 4805) in relative to the track/drive member 4800 such that the track/drive member 4800 may travel along a curved track 4600 while maintaining contact with the track 4600.

As illustrated in FIG. 17, the inner edges 4005 of wheels 4500 may be separated by a gap having a width slightly larger than the width of track 4600. In this way, the track 4600 can be positioned within the gap formed between adjacent wheels 4500 and the wheels 4500 help to stabilize the track/drive member 4800 on the track 4600 during movement of cleaning and track system 4000. In other words, the wheels 4500 provide stability and limit or reduce side-to-side movement of the track/drive member 4800. In alternative embodiments, gear 4700 and wheels 4500 may be attached to/interfaced with track 4600 in other suitable configurations to optimize movement of cleaning and track system 4000 within enclosed area.

In various embodiments, track/drive member 4800 may include a spring block 4202 attached to a first end of a spring 4200 and a spring tensioner 4300 attached to a second end of the spring 4200. See FIG. 16. In exemplary embodiments, track/drive member 4800 includes one spring block 4202 attached to two springs 4200 and two spring tensioners 4300.

Spring 4200 may be configured to provide additional stability to track/drive system 4140 and further provide additional spring action for vertical movement of cleaning and track system 4000. In certain embodiments, the spring 4200, spring block 4202, spring tensioners 4300, and wheel shafts 4807 movable within the wheel slots 4803 allow for the track/drive member 4800 maintain contact with the track 4600 as the track/drive member 4800 travels along the track 4600. Particularly, the wheel shafts 4807 may individually slide within the wheel slots 4803 relative to the base 4801 to accommodate changes in curvature of the track. As the wheel shafts 4807 move to accommodate the track, the spring 4200 may compress and/or extend such that the wheels 4500 maintain contact on the track 4600. For example, as illustrated in FIG. 19, when the track/drive member 4800 climbs the curved portion of the track 4600, the wheels 4500 may slide within the wheel slots 4803 relative to the base 4801 depending on the position of the track/drive member 4800 relative to the curved portion, and through the spring 4200, the track/drive member 4800 maintains contact with the track 4600 while going around the curved portion and vertically climbing the track 4600. Spring block 4202 may be configured to provide support/stability to springs 4200 and/or cleaning and track system 4000. Spring tensioners 4300 may be a suitable device or mechanism that applies a force to create or maintain tension within springs 4200.

In alternative embodiments, cleaning apparatus 1000 and track/drive system 4140 may be attached to each other via other suitable attachment mechanisms and/or driven via other pneumatic and/or electrical methods such that track/drive system 4140 may facilitate additional movement of apparatus 1000 within enclosed area.

A vacuum line 4009 (see FIG. 19) may be placed on or near the floor of an area to be cleaned and may be configured to remove water and fluidized debris/materials from the area. One or more cleaning apparatuses 100, 1000 and/or cleaning and track systems 400, 4000 may be placed within an area to be cleaned. Embodiments of cleaning and track systems

400, 4000 may further be used in conjunction with other cleaning systems, for example, the systems described in U.S. patent applications Ser. Nos. 13/135,018 and 14/530,455, both of which are hereby incorporated by reference in their entireties.

Cleaning and track system 400, 4000 may be controlled manually or using preprogrammed algorithms through a PLC device. In exemplary embodiments, as described herein, the cleaning and track system 400, 4000 includes sensor and positioning components affixed to the MAAA 103, 1030 and/or track/drive system 414, 4140 and that are configured to send relevant positioning and other data to the PLC device. Sensor and positioning components may include the first external sensor 1500, second external sensor 1502, and/or first internal sensor 1504 described herein. In other embodiments, sensor and positioning components may include a laser based device, an ultrasonic based device, an optical based device, linear transducers, angle transducers, magnetic transducers, thermal light imaging devices, or other similar devices. In particular embodiments, the laser sensor may be a rangefinder sensor such as a SICK Optic Laser Scanner.

Cleaning and track system 400, 4000 may be programmed via operational steps of Instructing (or Teaching), Route Profiling, and Reproduction (or Playback). Methods using these particular operational steps are disclosed in U.S. Pat. No. 8,260,483, which is hereby incorporated by reference in its entirety. Specifically, U.S. Pat. No. 8,260,483 discloses methods including instructing/teaching a route and logging resulting route data from sensors to a memory; processing the logged data into a route profile (comprised of, in this case, a cleaning sequence); and reproducing/playing back the profiled route automatically using a control system.

Instructing or teaching is an on line operation whereby an operator may manually or remotely control the apparatus 100, 1000 and/or cleaning and track system 400, 4000 described herein through a PLC device. In exemplary embodiments, the PLC device may be a known PLC device that uses the IQAN electronic control system with a MD3 Module. PLC devices are standard in many industrial automation systems and used to synchronize overall system operation such that robot controller resources may be focused only on robot arm operation. The purpose of the instructing or teaching method is to allow an operator to define a cleaning route or sequence to be subsequently played back. The route may constitute an initial cleaning of an enclosed area including an arbitrary sequence of maneuvers positioning the apparatus 100, 1000 and/or cleaning and track system 400, 4000 for optimal cleaning purposes.

Under the next Route Profiling step, generally an offline activity, positioning data is derived from the sensor and positioning components attached to the MAAA 103, 1030 and/or track/drive system 414, 4140. Systems and apparatuses utilizing MAAAs and sensor and positioning components to derive positioning data are disclosed in U.S. Pat. Nos. 8,942,940, 8,997,362, and 8,965,571, all of which are hereby incorporated by reference in their entireties. Particularly, these patents disclose connected arm segments including at least one position transducer for producing a position signal, an electronic circuit for receiving the position signals from the transducer and for providing data corresponding to a position of a nozzle connected to the arm segments, and logic executable by the electronic circuit.

Once received from the sensor and positioning components, the positioning data is then logged to a log file on a processor in a computer or similar device for processing at a later point; the purpose being to define a route, for subsequent reproduction, by operating the MAAA 103, 1030 according to certain conditions. The computer may be located remotely at the control station or in another location near the area being cleaned. A log file may be a file on a mass storage device accessible by a computer processor attached and/or connected to the apparatus 100, 1000, containing time-stamped sensor readings that were recorded during the instructing/teaching run along the route. Particularly, raw data is compiled and processed to create a particular route profile configured to profile a particular enclosed area. In exemplary embodiments, the route profile includes information representing a cleaning sequence configured to assist in cleaning the enclosed area.

Once generated, the Route Profile is then implemented in the next step—Reproduction or Playback. Reproduction is an online method whereby the PLC device is configured to automatically reproduce or playback the cleaning sequence using the saved Route Profile, and also constantly monitor the sensor and positioning components. The PLC device is configured to repeat the pre-programmed cleaning sequence by sending and receiving signals simultaneously.

Referring back to FIG. 5, a flow chart depicting a method of programming the cleaning and track system 400, 4000 is shown. The PLC device 501 controls all movement of the track system and/or MAAA 503 by sending an electrical signal to an Electro-Hydraulic Flow Control (EHFC) device 502. In exemplary embodiments, the EHFC device may be a known EHFC device that uses a Continental Directional Control valve with 24 volt DC solenoids. SWH-GO-C4-D24-20 and VED03M-3AC-I 6-A-KI-24DC may be two different size controllers on the valve. EHFC device 502 is configured to receive the electric signal from the PLC device 501, and thereby control nozzle valve operation of apparatus 100. The EHFC device 502 may be configured to provide hydraulic, pneumatic and/or electrical output.

Figure 5:
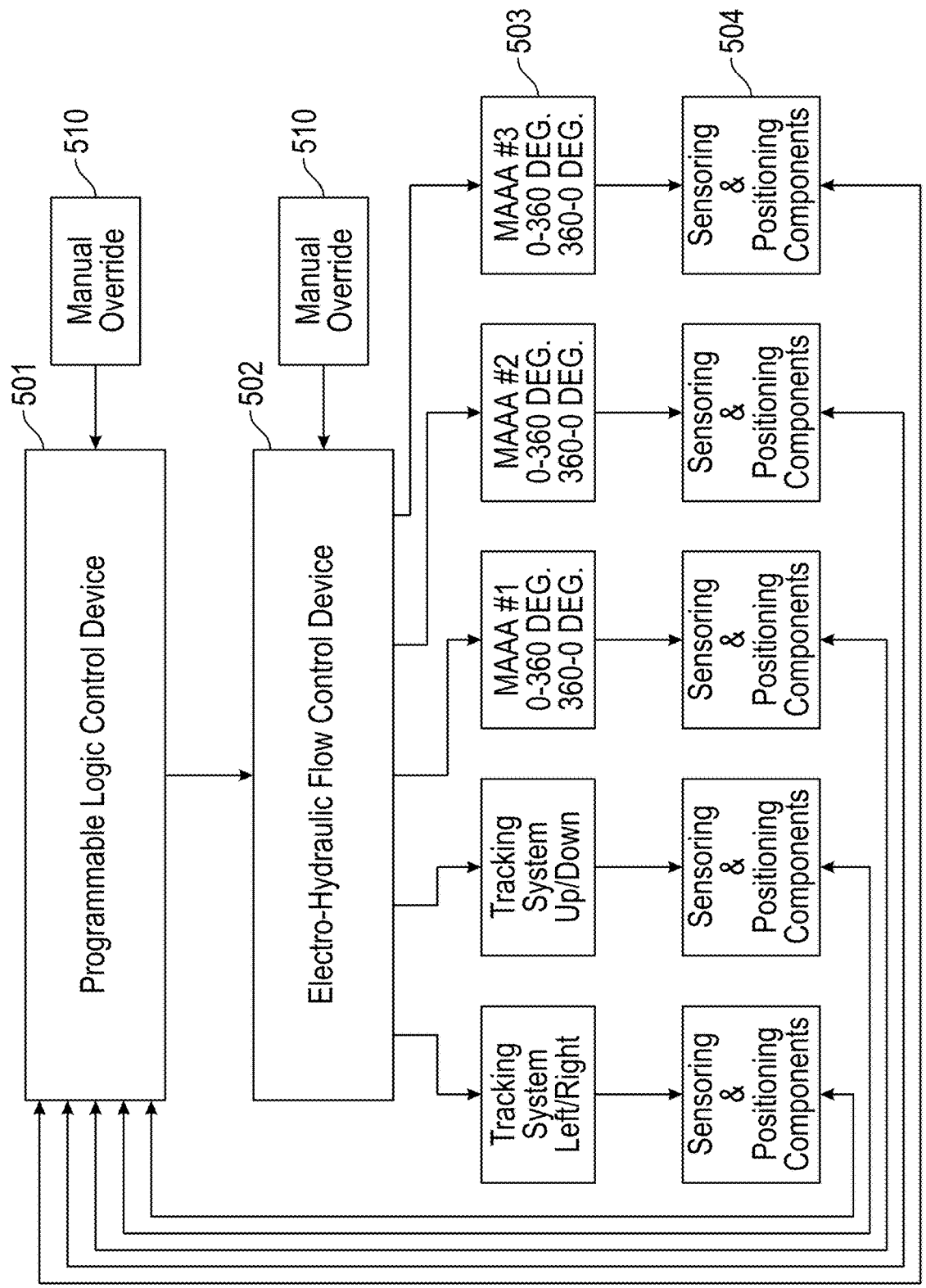
FIG. 5 is a flow chart depicting a method of programming a cleaning and track system according to aspects of the present disclosure.

In some embodiments, the PLC device 501 may bypass control of the EHFC device 502 by providing direct electrical signals to the track system and/or MAAA 503. In other embodiments, as shown in FIG. 5, PLC device 501 provides direct electrical signals to the sensor and positioning components 504. Sensor and positioning components 504 may include the first external sensor 1500, second external sensor 1502, and/or first internal sensor 1504 described herein. Sensor and positioning components 504 may be located in multiple different areas on the track system and/or MAAA 503 as described herein and may provide a multitude of different functions.

Manual overrides 510 may be accomplished at any time during operation and programming of the cleaning sequence. Overrides 510 may occur through control of the PLC device 501 or the EHFC device 502. Overrides 510 may be accomplished by using control mechanisms located within a cabin/control station located remotely, which may then override automated controls of the PLC device. Overrides 510 may also be accomplished via manual valve control through a lever system within the EHFC device. Finally, these steps may be repeated until the desired optimal cleaning sequence is completed.

Figure 6:
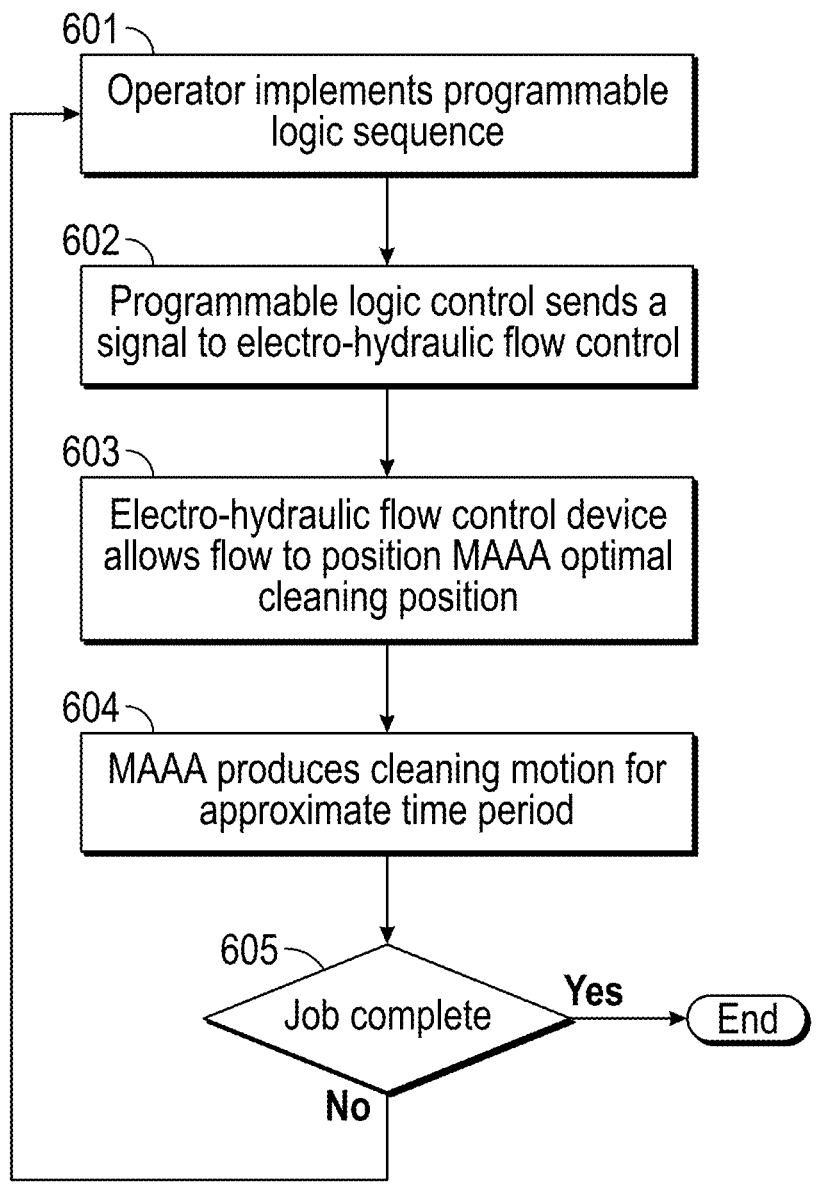
FIG. 6 is a flow chart depicting a method of cleaning using a programmable cleaning and track system, according to aspects of the present disclosure.

Referring now to FIG. 6, a flow chart depicting a method of cleaning using a programmable cleaning and track system 400, 4000 is shown. The method includes a first step 601 of using an operator to implement a programmable starting logic sequence configured to allow the PLC device 501 as disclosed herein to begin sending and receiving signals. Operator may typically be a skilled person who works with the cleaning and track system 400 to ensure that the track system 400 functions properly, performs ongoing quality control, and provides an overall level of craftsmanship that may be lacking in a fully automated system. Alternatively, the sequence may be implemented without an operator.

In the next step 602, once the sequence is implemented, the PLC device 501 begins to receive a signal from the sensor and positioning components 504, thereby allowing the PLC device 501 to send the correct signal to the EHFC device 502.

In the next step 603, the EHFC device 502 receives the signal from the PLC device 501, and then provides for resulting hydraulic, pneumatic and/or electrical flow to position the track system and/or MAAA 503 in an optimal cleaning position.

In the next step 604, track system and/or MAAA 503, produce the optimal cleaning motion for a pre-determined time period according to pre-programmed algorithms. This optimal cleaning motion includes smooth and consistent maneuvers of the track system and/or MAAA 503, and further limits useless, random, and wasted movement of the system by targeting a specific area for cleaning within an enclosed area.

The specific time to clean an enclosed area or other surface may vary depending on several factors, including but not limited to the size of the area or surface to be cleaned and the amount of material to be cleaned. Embodiments of the present disclosure may provide for at least a 33% reduction in overall cleaning time compared to existing systems.

Finally, in step 605, if an area has been sufficiently cleaned, the cleaning process is completed and the track system and/or MAAA 503 may be removed from the area. However, if the area requires further cleaning, steps 602, 603, 604 for cleaning using the programmed cleaning and track system 400 and cleaning sequence may be repeated until the area has been fully cleaned. If additional areas require cleaning, the cleaning and track system 400 may be moved to those areas, and steps 601, 602, 603, 604 for cleaning may be repeated until the areas have been fully cleaned.

In embodiments of the present disclosure, a method of cleaning an area is provided. The method includes delivering/moving a cleaning apparatus 100, 1000 and/or cleaning and track system 400, 4000 as described herein to the area to be cleaned. Cleaning apparatus 100, 1000 and/or cleaning and track system 400, 4000 may be assembled within the area or may be assembled prior to being placed within the area. The method includes mounting the apparatus 100, 1000 and/or cleaning and track system 400, 4000 within or near the area. The method includes connecting the apparatus 100, 1000 to a high pressure fluid line, remotely operating the apparatus 100, 1000 to control a direction of flow from the high pressure fluid line, directing the flow of fluids towards material on a surface of the area to remove the material from the surface, and removing the fluids and material via a vacuum line. Once cleaning is complete, the apparatus 100, 1000 and/or cleaning and track system 400, 4000 may be removed from the area.

FIGS. 21-24 illustrate another embodiment of a cleaning apparatus 10. The cleaning apparatus 10 includes a support structure 12. Optionally, the support structure 12 includes at least one drive motor 14, which may be similar to the drive motors of the cleaning apparatus 100 and/or the cleaning apparatus 1000. A cover 16 is optionally provided to enclose the drive motor 14. In some cases, the support structure 12 includes connector tabs 18 which may be used to connect the cleaning apparatus 10 to a movement system that allows for positioning of the cleaning apparatus 10 within the container (e.g., a lifting mechanism, the track system 4000, or various other suitable mechanisms or systems).

In certain embodiments, the cleaning apparatus 10 includes a rotatable base 20 that is rotatable relative to the support structure 12 (see arrow 22). In some embodiments, the rotatable base 20 is rotatable about a base axis of rotation 24. The rotatable base 20 has a first end 21 and a second end 23 opposite from the first end 21. Optionally, a camera 26 may be mounted on the rotatable base 20 (or on the container or various other suitable locations on the cleaning apparatus 10). In FIGS. 21-24, the camera 26 is mounted on the rotatable base 20 between the first end 21 and the second end 23. Similar to the camera described above, the camera 26 may monitor the cleaning apparatus 10 such that adjustments may be made as needed, such as during cleaning.

The cleaning apparatus 10 also includes an extendable arm 28 which is positionable relative to the rotatable base 20 (see arrow 30). In certain examples, the extendable arm is positionable along the base axis of rotation 24, although it need not be.

In various embodiments, the cleaning apparatus 10 includes a nozzle support 32. In some embodiments, the nozzle support 32 is at an end of the extendable arm 28, although it need not be. Through the extendable arm 28, the nozzle support 32 is positionable relative to the rotatable base 20, and through the rotatable base 20, the nozzle support 32 is rotatable relative to the support structure 12. In some examples, the nozzle support 32 is configured to support at least one third arm member 1590 and/or at least one second arm member 1360 (and/or at least one first arm member 1220). In the example illustrated in FIGS. 21-24, the nozzle support 32 supports two third arm members 1590 and two second arm members 1360. As previously discussed, the second arm members 1360 are rotatable about second axes of rotation 34A-B (see arrows 36A-B) and the third arm members are rotatable about third axes of rotation 38A-B (see arrows 40A-B).

Figure 24:
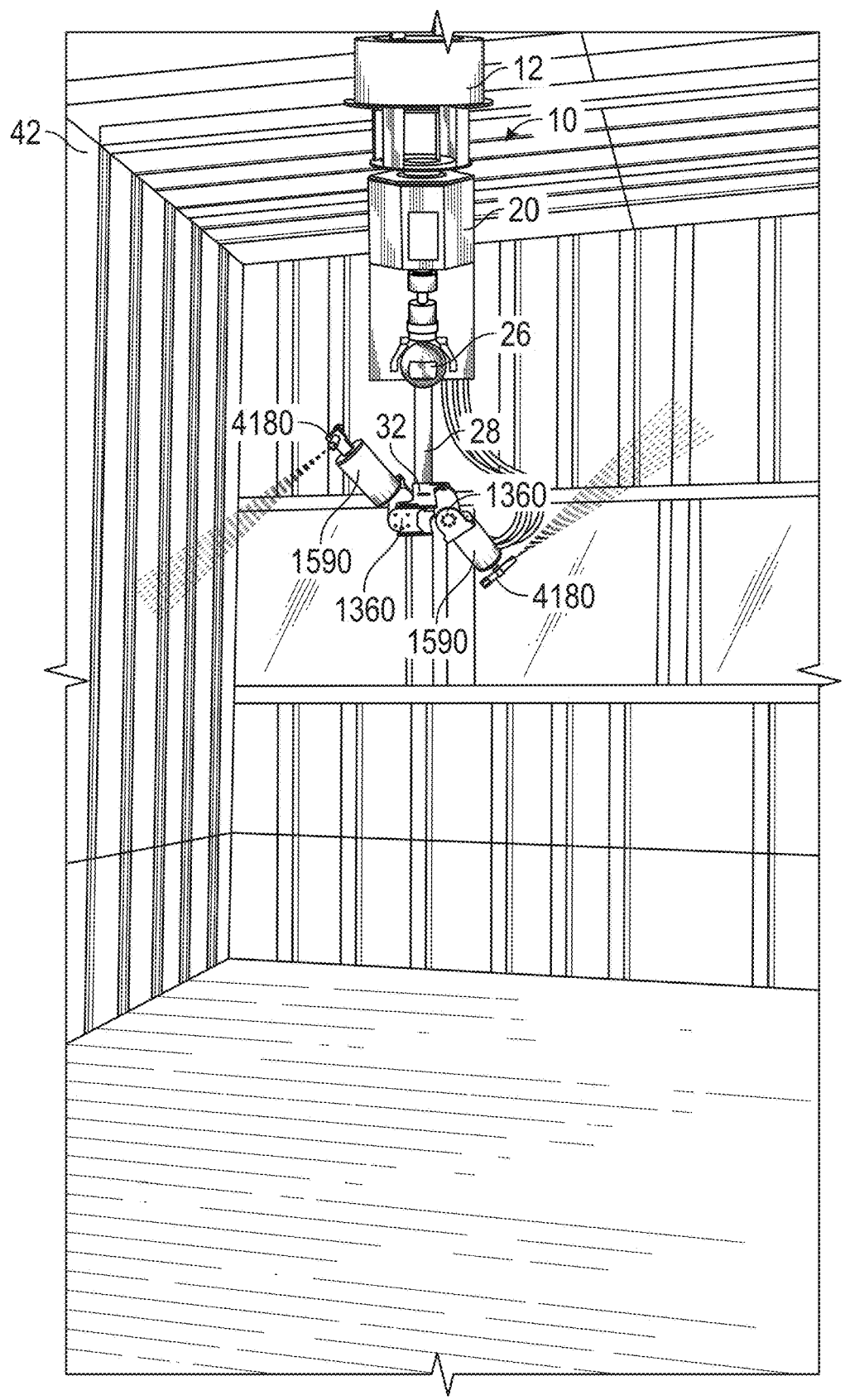
FIG. 24 is a partial perspective view of the cleaning system of FIG. 21 within a container.

Through the movement indicated by the arrows 22, 30, 36A-B, and/or 38A-B, the cleaning apparatus 10 can selectively control where nozzles distribute water, such as within a container 42 (see FIG. 24).

A collection of exemplary embodiments, including at least some explicitly enumerated as "ECs" (Example Combinations), providing additional description of a variety of embodiment types in accordance with the concepts described herein are provided below. These examples are not meant to be mutually exclusive, exhaustive, or restrictive; and the invention is not limited to these example embodiments but rather encompasses all possible modifications and variations within the scope of the issued claims and their equivalents.

EC 1. A cleaning apparatus, comprising: an arm; and a nozzle assembly attached to an end of the arm, wherein the arm includes at least two rotatable arm members allowing for manipulation of the nozzle assembly and at least one sensor attached to each of the at least two rotatable arm members to detect the positioning and location of the apparatus.

EC 2. The apparatus of any of the preceding or subsequent example combinations, wherein the arm includes: a first arm member; a second arm member attached to the first arm member, and a third arm member having a first end and a second end, the third arm member attached to the second arm member at the first end and to the nozzle assembly at the second end, wherein the first arm member is configured to rotate around a first axis, wherein the second arm member and third arm member are configured to rotate relative to the first arm member around a second axis that is substantially perpendicular to the first axis.

EC 3. The apparatus of any of the preceding or subsequent example combinations, wherein the first arm member includes first and second hinge connectors interconnected via a rotatable first actuator assembly.

EC 4. The apparatus of any of the preceding or subsequent example combinations, wherein the second arm member includes third and fourth hinge connectors interconnected via a rotatable second actuator assembly.

EC 5. The apparatus of any of the preceding or subsequent example combinations, wherein the first hinge connector is fixedly attached to a plate and the second hinge connector is rotatably attached to the first actuator assembly such that the second hinge connector rotates around the first axis.

EC 6. The apparatus of any of the preceding or subsequent example combinations, wherein the third hinge connector is fixedly attached to the second hinge connector and the fourth hinge connector is rotatably attached to the second actuator assembly such that the fourth hinge connector rotates relative to the first arm member around the second axis.

EC 7. The apparatus of any of the preceding or subsequent example combinations, wherein the third arm member is fixedly attached to the second arm member such that the third arm member rotates relative to the first arm member along the second axis.

EC 8. The apparatus of any of the preceding or subsequent example combinations, wherein the third arm member includes a housing attached to a rotatable third actuator assembly.

EC 9. The apparatus of any of the preceding or subsequent example combinations, wherein the nozzle assembly includes a nozzle held in place by a nozzle grip attached to a shaft, wherein the nozzle assembly is configured for 360 degree rotation via connection of the shaft to the rotatable third arm member.

EC 10. The apparatus of any of the preceding or subsequent example combinations, wherein the first actuator assembly includes a fixed end, a rotating end opposite the fixed end, and a shaft positioned within the first actuator assembly such that a first end of the shaft interacts with the fixed end and a second end of shaft interacts with the rotating end.

EC 11. The apparatus of any of the preceding or subsequent example combinations, wherein the second actuator assembly includes a fixed end, a rotating end opposite the fixed end, and a shaft positioned within the second actuator assembly such that a first end of the shaft interacts with the fixed end and a second end of shaft interacts with the rotating end.

EC 12. The apparatus of any of the preceding or subsequent example combinations, wherein the third actuator assembly includes a fixed end, a rotating end opposite the fixed end, and a shaft positioned within the third actuator assembly such that a first end of the shaft interacts with the fixed end and a second end of shaft interacts with the rotating end.

EC 13. The apparatus of any of the preceding or subsequent example combinations, wherein the apparatus includes a first external sensor attached to the first arm member, a second external sensor attached to the second arm member, and a first internal sensor attached to the third arm member.

EC 14. The apparatus of any of the preceding or subsequent example combinations, wherein the apparatus includes a first internal sensor installed within the housing such that the first internal sensor interfaces with the fixed end of the third actuator assembly.

EC 15. The apparatus of any of the preceding or subsequent example combinations, wherein the first end of the shaft is inserted through the fixed end and into a rotating keyhole of the first internal sensor, wherein the keyhole is configured to rotate during rotation of the shaft such that the first internal sensor obtains the positioning and location of the apparatus.

EC 16. The apparatus of any of the preceding or subsequent example combinations, further comprising control lines connected to a control station, the control lines configured to control movement of the at least two rotatable arm members.

EC 17. A system for cleaning an area, comprising: a cleaning apparatus, comprising: an arm; and a nozzle assembly attached to an end of the arm, wherein the arm includes at least two rotatable arm members allowing for manipulation of the nozzle assembly and at least one sensor attached to each of the at least two rotatable arm members to detect the positioning and location of the apparatus; at least one camera mounted within the area; and a vacuum line mounted within the area, wherein the apparatus is configured to spray a fluid via the nozzle assembly and the vacuum line removes the fluid and any materials contained in the fluid, wherein an operator views the apparatus and area via the at least one camera.

EC 18. The system of any of the preceding or subsequent example combinations, further comprising: control lines configured to control movement of the at least two rotatable arm members, wherein the control lines are connected to a control station and are configured to allow the operator to remotely operate the apparatus.

EC 19. The system of any of the preceding or subsequent example combinations, further comprising a track system including a track member movably attached to a gear rack, wherein a first end of the track member is attached to the apparatus and the second end of the track member is attached to a bidirectional drive motor, wherein the motor is attached to the track member such that a gear of the motor interfaces with the rack to facilitate movement of the track system and apparatus along the rack.

EC 20. A cleaning and track system, comprising: a cleaning apparatus, comprising: an arm; and a nozzle assembly attached to an end of the arm, wherein the arm includes at least two rotatable arm members allowing for manipulation of the nozzle assembly and at least one sensor attached to each of the at least two rotatable arm members to detect the positioning and location of the apparatus; a track system movably attached to the apparatus, comprising: a gear rack; and a track member movably attached to the gear rack, wherein a first end of the track member is attached to the apparatus and the second end of the track member is attached to a bi-directional drive motor, wherein the motor is attached to the track member such that a gear of the motor interfaces with the rack to facilitate movement of the track system and apparatus along the rack; at least one camera mounted near the cleaning and track system; and a vacuum line mounted near the cleaning and track system, wherein the apparatus is configured to spray a fluid via the nozzle assembly and the vacuum line removes the fluid and any materials contained in the fluid, wherein an operator views the apparatus via the at least one camera.

EC 21. The system of any of the preceding or subsequent example combinations, further comprising control lines configured to control movement of the at least two rotatable arm members, wherein the control lines are connected to a control station and are configured to allow the operator to remotely operate the apparatus and track system.

EC 22. The system of any of the preceding or subsequent example combinations, wherein the track member includes a spring block attached to a first end of a spring and a spring tensioner attached to a second end of the spring, wherein the spring compresses or extends to facilitate movement of the apparatus along the rack.

EC 23. A method of cleaning an area, comprising: mounting a cleaning apparatus within the area, the cleaning apparatus comprising: an arm; and a nozzle assembly attached to an end of the arm, wherein the arm includes at least two rotatable arm members allowing for manipulation of the nozzle assembly and at least one sensor attached to each of the at least two rotatable arm members to detect the positioning and location of the apparatus; connecting the cleaning apparatus to a high pressure fluid line; remotely operating the cleaning apparatus to control a direction of flow from the high pressure fluid line; directing a flow of fluids towards material on a surface of the area to remove the material from the surface; and removing the fluids and material via a vacuum line.

EC 24. The method of any of the preceding or subsequent example combinations, wherein the apparatus is remotely operated via control lines connected from a control station to the apparatus, the control lines configured to control movement of the at least two rotatable arm members.

EC 25. The method of any of the preceding or subsequent example combinations, further comprising attaching the apparatus to a track system including a track member movably attached to a gear rack, wherein a first end of the track member is attached to the apparatus and the second end of the track member is attached to a bi-directional drive motor, wherein the motor is attached to the track member such that a gear of the motor interfaces with the rack to facilitate movement of the track system and apparatus along the rack.

EC 26. The method of any of the preceding or subsequent example combinations, wherein the apparatus is programmed by the steps of: instructing a route to the apparatus by the steps of: controlling the apparatus and defining the route via implementation of a starting cleaning sequence, wherein the route includes an initial cleaning of the area including a sequence of maneuvers positioning the apparatus for optimal cleaning purposes; and logging resulting route data from the at least one sensor to a memory; processing logged route data into a route profile, wherein the route profile includes a defined optimal cleaning sequence; and reproducing the route profile automatically using a Programmable Logic Control (PLC) device.

EC 27. The method of any of the preceding or subsequent example combinations, wherein the apparatus is operated by the steps of implementing the starting cleaning sequence using the PLC device, wherein the PLC device is configured to receive an electrical signal from the at least one sensor once the starting cleaning sequence is implemented; sending the signal to an Electro-Hydraulic Flow Control (EHFC) device via the PLC device, wherein the EHFC device is configured to provide at least one of hydraulic, pneumatic, and electrical flow; positioning the apparatus in an optimal cleaning position based on the signal and flow via the EHFC device; and performing a cleaning motion for a pre-determined amount of time according to the defined optimal cleaning sequence, wherein the PLC device is configured to repeat the defined optimal cleaning sequence by simultaneously sending and receiving signals.

EC 28. The method of any of the preceding or subsequent example combinations, further comprising observing movements of the cleaning apparatus and track system via at least one camera mounted within the area or on the apparatus.

EC 29. The method of any of the preceding or subsequent example combinations, wherein the steps for operating the apparatus are repeated until the area is cleaned.

EC 30. A cleaning apparatus, comprising: a nozzle assembly; and an arm supporting the nozzle assembly, wherein the arm comprises: a first rotatable arm member defining a first axis, wherein the first rotatable arm is rotatable about the first axis; a second rotatable arm member defining a second axis and connected to the first rotatable member, wherein the second rotatable arm is rotatable about the second axis; and at least one sensor on the arm configured to detect a position of the nozzle assembly based on rotation of the first rotatable arm or the second rotatable arm.

EC 31. The cleaning apparatus of any of the preceding or subsequent example combinations, wherein the first rotatable arm member comprises a fixed end and a rotating end, wherein the fixed end is in a fixed position relative to the first axis, and wherein the rotating end is rotatable about the first axis and relative to the fixed end.

EC 32. The cleaning apparatus of any of the preceding or subsequent example combinations, wherein the first axis is perpendicular to the second axis.

EC 33. The cleaning apparatus of any of the preceding or subsequent example combinations, wherein the arm further comprises a third rotatable arm member defining a third axis, wherein the third rotatable arm is rotatable about the third axis, and wherein the third axis is perpendicular to the second axis.

EC 34. The cleaning apparatus of any of the preceding or subsequent example combinations, wherein the first arm member comprises a first hinge connector, a second hinge connector, and a first actuator assembly.

EC 35. The cleaning apparatus of any of the preceding or subsequent example combinations, wherein the first hinge connector is fixedly attached to a plate and the second hinge connector is rotatably attached to the first actuator assembly such that the second hinge connector rotates around the first axis relative to the first hinge connector.

EC 36. The cleaning apparatus of any of the preceding or subsequent example combinations, wherein the second arm member comprises a third hinge connector, a fourth hinge connector, and a second actuator assembly, wherein the third hinge connector is fixedly attached to the second hinge connector, and wherein the fourth hinge connector is rotatably attached to the second actuator assembly such that the fourth hinge connector rotates about the second axis relative to the third hinge connector.

EC 37. The cleaning apparatus of any of the preceding or subsequent example combinations, wherein the at least one sensor comprises a first external sensor attached to the first arm member and a second external sensor attached to the second arm member.

EC 38. A cleaning system comprising: a cleaning apparatus; and a drive system comprising: a track; and a carriage movable along the track and comprising a spring block, a track member, and at least one spring connecting the spring block and the track member, wherein the at least one spring member is movable between an expanded position and a compressed position such that the spring block is adjustable relative to the track member, and wherein the cleaning apparatus is attached to the carriage.

EC 39. The cleaning system of any of the preceding or subsequent example combinations, wherein the cleaning apparatus comprises an arm and a nozzle assembly attached to the arm, and wherein the arm comprises: a first rotatable arm member defining a first axis, wherein the first rotatable arm is rotatable about the first axis; a second rotatable arm member defining a second axis and connected to the first rotatable member, wherein the second rotatable arm is rotatable about the second axis; and at least one sensor on the arm configured to detect a position of the nozzle assembly based on rotation of the first rotatable arm or the second rotatable arm.

EC 40. The cleaning system of any of the preceding or subsequent example combinations, wherein the track comprises a top side and a bottom side opposite the top side, wherein the top side comprises a plurality of teeth, and wherein the track defines a track width in a direction transverse to a direction from the top side to the bottom side.

EC 41. The cleaning system of any of the preceding or subsequent example combinations, wherein the track member further comprises at least one wheel movable along bottom side of the track, wherein the at least one wheel comprises a first edge and a second edge, wherein a distance between the first edge and the second edge is greater than the track width, and wherein the at least one wheel is movable along the track such that the track is between the first edge and the second edge and the first edge and the second edge at least partially overlap the track.

EC 42. The cleaning system of any of the preceding or subsequent example combinations, wherein the track comprises a first track portion, a second track portion, and a curved track portion connecting the first track portion to the second track portion, wherein the first track portion extends in a first direction, and wherein the second track portion extends in a second direction different from the first direction.

EC 43. A cleaning system comprising: a cleaning apparatus comprising a nozzle assembly and an arm supporting the nozzle assembly, wherein the arm comprises: a first rotatable arm member defining a first axis, wherein the first rotatable arm is rotatable about the first axis; a second rotatable arm member defining a second axis and connected to the first rotatable member, wherein the second rotatable arm is rotatable about the second axis; and at least one sensor on the arm configured to detect a position of the nozzle assembly based on rotation of the first rotatable arm or the second rotatable arm; and a drive system comprising a track and a carriage movable along the track, wherein the cleaning apparatus is attached to the carriage.

EC 44. The cleaning system of any of the preceding or subsequent example combinations, wherein the carriage comprises a spring block, a track member, and at least one spring connecting the spring block and the track member, and wherein the at least one spring member is movable between an expanded position and a compressed position such that the spring block is adjustable relative to the track member.

EC 45. The cleaning system of any of the preceding or subsequent example combinations, wherein the first rotatable arm member comprises a fixed end and a rotating end, wherein the fixed end is in a fixed position relative to the first axis, and wherein the rotating end is rotatable about the first axis and relative to the fixed end EC 46. The cleaning system of any of the preceding or subsequent example combinations, wherein the arm further comprises a third rotatable arm member defining a third axis, wherein the third rotatable arm is rotatable about the third axis, and wherein the third axis is perpendicular to the second axis.

EC 47. The cleaning system of any of the preceding or subsequent example combinations, wherein the track comprises a top side and a bottom side opposite the top side, wherein the top side comprises a plurality of teeth, and wherein the track defines a track width in a direction transverse to a direction from the top side to the bottom side.

EC 48. The cleaning system of any of the preceding or subsequent example combinations, wherein the wherein the carriage comprises a spring block, a track member, and at least one spring connecting the spring block and the track member, and wherein the track member further comprises at least one wheel movable along bottom side of the track, wherein the at least one wheel comprises a first edge and a second edge, wherein a distance between the first edge and the second edge is greater than the track width, and wherein the at least one wheel is movable along the track such that the track is between the first edge and the second edge and the first edge and the second edge at least partially overlap the track.

EC 49. The cleaning system of any of the preceding or subsequent example combinations, wherein the track member further comprises at least one gear wheel movable along the top side of the track, and wherein the at least one gear wheel comprises a plurality of teeth configured to engage the plurality of teeth on the top side of the track.

The above-described aspects are merely possible examples of implementations, merely set forth for a clear understanding of the principles of the present disclosure. Many variations and modifications can be made to the above-described embodiment(s) without departing substantially from the spirit and principles of the present disclosure. All such modifications and variations are intended to be included herein within the scope of the present disclosure, and all possible claims to individual aspects or combinations of elements or steps are intended to be supported by the present disclosure. Moreover, although specific terms are employed herein, as well as in the claims that follow, they are used only in a generic and descriptive sense, and not for the purposes of limiting the described invention, nor the claims that follow.

That which is claimed:

1. A cleaning apparatus comprising:
   a base rotatable about a base axis of rotation;
   an extendable arm;
   a nozzle assembly; and
   a cleaning arm supported on the extendable arm and supporting the nozzle assembly, wherein the cleaning arm comprises:
   a nozzle support connected to the extendable arm;
   at least two first arm members, wherein each arm member is attached to the nozzle support, and wherein each first arm member is rotatable about an arm axis of rotation relative to the nozzle support, and wherein
   the arm axes of rotation of the at least two first arm members are offset from each other; and
   at least one sensor configured to detect a position of the nozzle assembly based on rotation at least one of the at least two first arm members,
   wherein the extendable arm is extendable along an extendable arm axis that is parallel to the base axis of rotation such that a distance between the nozzle support and the base is adjustable, and
   wherein the base axis of rotation is not parallel to the first axes of rotation of the at least two first arm members.

2. The cleaning apparatus of claim 1, wherein each first arm member comprises a fixed end and a rotating end, and wherein, for each first arm member, the fixed end is in a fixed position relative to the first axis of rotation and the rotating end is rotatable about the first axis of rotation and relative to the fixed end.

3. The cleaning apparatus of claim 1, wherein the base axis of rotation is perpendicular to the first axes of rotation.

4. The cleaning apparatus of claim 1, wherein the cleaning arm further comprises a second arm member attached to one of the at least two first arm members, wherein the second arm member is rotatable about a second axis of rotation, and wherein the second axis of rotation is perpendicular to the first axis of rotation of the one of the at least two first arm members.

5. The cleaning apparatus of claim 1, wherein the first arm member comprises a first hinge connector, a second hinge connector, and a first actuator assembly.

6. The cleaning apparatus of claim 5, wherein the first hinge connector is fixedly attached to a plate and the second hinge connector is rotatably attached to the first actuator assembly such that the second hinge connector rotates around the first axis of rotation relative to the first hinge connector.

7. The cleaning apparatus of claim 1, wherein the at least two first arm members comprises a first first arm member and a second first arm member, wherein the at least one sensor comprises a first sensor attached to the first first arm member and a second sensor attached to the second first arm member.

8. The cleaning apparatus of claim 1, wherein rotation of the rotatable base rotates the extendable arm and the cleaning arm.

9. The cleaning apparatus of claim 1, wherein the cleaning arm is coupled to the extendable arm via the nozzle support.

10. The cleaning apparatus of claim 1, wherein the nozzle assembly is a first nozzle assembly, the at least two first arm members comprise a first first arm member and a second first arm member, and wherein the cleaning apparatus comprises:
    a second nozzle assembly;
    a first second arm member supported on the first first arm member; and
    a second second arm member supported on the second first arm member and rotatable about a second axis of rotation of the second second arm member that is not parallel to the first axis of rotation of the second first arm member,
    wherein the second nozzle assembly is supported on the second second arm member.

11. The cleaning apparatus of claim 10, wherein the first axis of rotation of the second first arm member is substantially parallel to the first axis of rotation of the first first arm member.

\* \* \* \* \*